(12) United States Patent
Lei

(10) Patent No.: US 12,081,976 B2
(45) Date of Patent: Sep. 3, 2024

(54) COMMUNICATION METHOD AND RELATED DEVICE

(71) Applicant: Huawei Technologies Co., Ltd., Shenzhen (CN)

(72) Inventor: Zhongding Lei, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/672,391

(22) Filed: Feb. 15, 2022

(65) Prior Publication Data

US 2022/0174488 A1 Jun. 2, 2022

Related U.S. Application Data

(63) Continuation of application No. PCT/CN2019/100881, filed on Aug. 15, 2019.

(51) Int. Cl.
*H04W 12/06* (2021.01)
*H04W 24/08* (2009.01)

(52) U.S. Cl.
CPC .......... *H04W 12/06* (2013.01); *H04W 24/08* (2013.01)

(58) Field of Classification Search
CPC ... H04W 12/06; H04W 24/08; H04W 12/082; H04W 12/61; H04L 63/0892
(Continued)

(56) References Cited

U.S. PATENT DOCUMENTS

| | | | |
|---|---|---|---|
| 8,793,490 B1 * | 7/2014 | Szwalbenest | H04L 69/14 713/168 |
| 2016/0371475 A1 * | 12/2016 | Zhao | H04L 63/08 |

(Continued)

FOREIGN PATENT DOCUMENTS

| | | |
|---|---|---|
| CA | 3057401 A1 | 9/2018 |
| CN | 108012267 A | 5/2018 |

(Continued)

OTHER PUBLICATIONS

"Update Slice-Specific Authentication and Authorisation," 3GPP TSG-SA WG2 Meeting #133, S2-1905663 (Revision of S2-1904722), Reno, US, pp. 1-9, 3rd Generation Partnership Project, Valbonne, France (May 13-17, 2019).

(Continued)

*Primary Examiner* — Don N Vo
(74) *Attorney, Agent, or Firm* — Leydig, Voit & Mayer, Ltd.

(57) ABSTRACT

Embodiments provide a communication method and a related product. The method includes: After primary authentication between a core network and a user equipment succeeds, a network function entity in the core network assists a data network in performing secondary authentication between the data network and the user equipment if the secondary authentication further needs to be performed between the data network and the user equipment; the network function entity obtains an authentication result of the secondary authentication and a restriction condition of the secondary authentication from the data network; and the network function entity stores the authentication result and the restriction condition into the core network. The restriction condition may be introduced for the secondary authentication, to make it possible that the authentication result is properly restricted for use, and to lay a foundation for effective management of the authentication result of the secondary authentication.

20 Claims, 10 Drawing Sheets

(58) Field of Classification Search
USPC ........................................................ 455/411
See application file for complete search history.

(56) References Cited

U.S. PATENT DOCUMENTS

| | | | |
|---|---|---|---|
| 2018/0317086 A1 | 11/2018 | Ben Henda et al. | |
| 2019/0251239 A1* | 8/2019 | Kim | ........................ G06F 21/32 |
| 2020/0267554 A1* | 8/2020 | Faccin | .................. H04L 63/101 |

FOREIGN PATENT DOCUMENTS

| | | |
|---|---|---|
| CN | 108141756 A | 6/2018 |
| CN | 108347729 A | 7/2018 |
| CN | 109104726 A | 12/2018 |
| CN | 112105015 A | 12/2020 |
| WO | 2018137873 A1 | 8/2018 |

OTHER PUBLICATIONS

"3rd Generation Partnership Project; Technical Specification Group Services and System Aspects; Procedures for the 5G System; Stage 2 (Release 16)," 3GPP TS 23.502 V16.1.1, pp. 1-495, 3rd Generation Partnership Project, Valbonne, France (Jun. 2019).

* cited by examiner

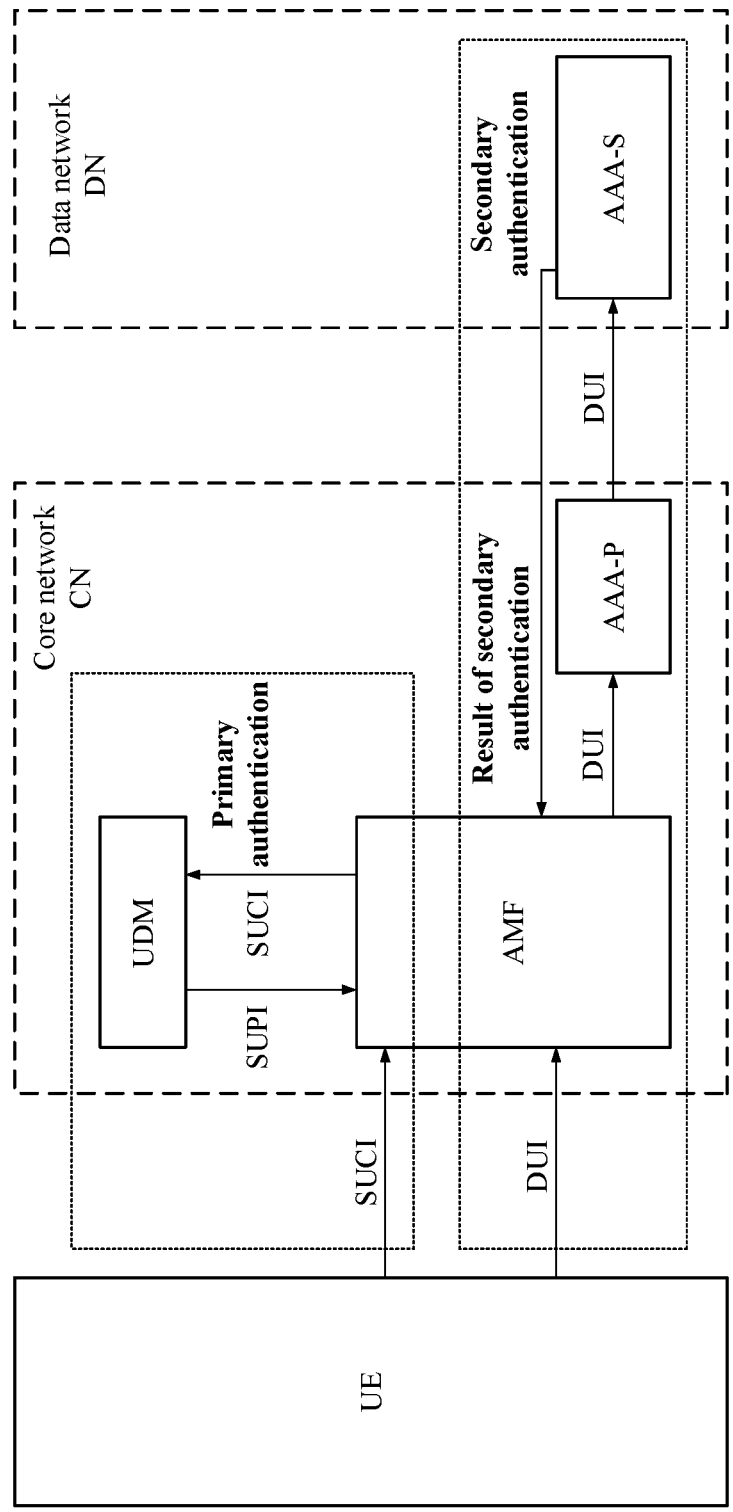
FIG. 2-A

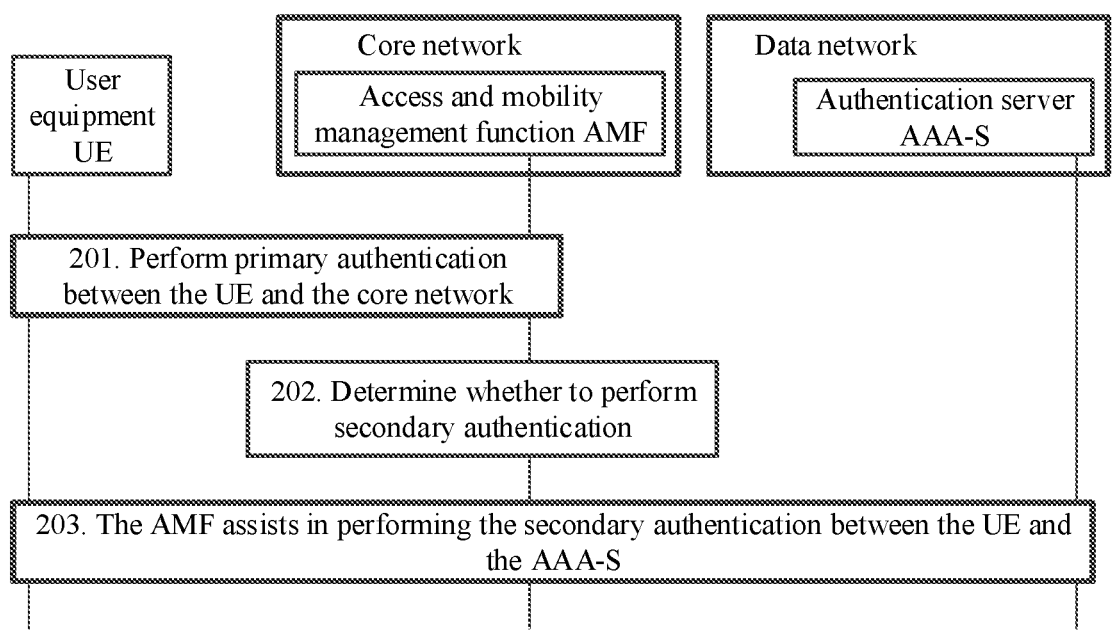
FIG. 2-B

COMMUNICATION METHOD AND RELATED DEVICE

CROSS-REFERENCE TO RELATED APPLICATIONS

This application is a continuation of International Application No. PCT/CN2019/100881, filed on Aug. 15, 2019, the disclosure of which is hereby incorporated by reference in its entirety.

TECHNICAL FIELD

This application relates to the communication field, and specifically, to a communication method, user equipment, a core network device, a data network device, a computer-readable medium, and the like.

BACKGROUND

The 3rd Generation Partnership Project (3GPP) proposes a concept of network slicing in a 5G (5th generation) network. Network slicing is briefly understood as that a physical network of an operator is sliced into a plurality of virtual end-to-end networks. These virtual networks, including devices, and access, transport, and core networks in the networks, are logically independent, and a fault occurring on any virtual network does not affect any other virtual network. Currently, various scenarios have different requirements on a 3GPP ecosystem, such as charging, policy, security, and mobility requirements. The 3GPP emphasizes that network slices do not affect each other. For example, a large quantity of burst meter reading services should not affect normal mobile broadband services. To meet diversified requirements and slice isolation, independent management and operation and maintenance are required for services, and customized service functions and analysis capabilities are provided. Instances of different service types may be deployed on different network slices, and different instances of a same service type may also be deployed on different network slices.

A slice in the 5G network is a virtual private network including a group of network functions and a sub-network. Many network slices can be deployed on an operator network. All slices may have different performance to meet requirements of different applications and vertical industries. The operator may "customize" a slice based on requirements of customers from different vertical industries. The operator may also allow some industry customers to have greater autonomy, for example, they can participate in some slice management and control functions. Slice-level authentication is a network control function in which industry customers can participate, that is, to authenticate and authorize access to a slice by a terminal user. Generally, authentication of access to the core network by a user terminal (or referred to as user equipment, a terminal, or the like) is referred to as primary authentication (primary authentication). In addition, the slice-level authentication (briefly referred to as "slice authentication") is also referred to as "secondary authentication". The secondary authentication is authentication between a data network and the terminal user.

Conventional technologies temporarily lack effective management of authentication results of the secondary authentication, which results in defects in security and effectiveness of operation of a secondary authentication-based service.

SUMMARY

Embodiments of this application provide a communication method and a related device.

A first aspect of the embodiments of this application provides a communication method. The method may include: after primary authentication between a core network and user equipment succeeds, a network function entity in the core network (such as an access and mobility management function (AMF)) assists a data network in performing secondary authentication between the data network and the user equipment if the secondary authentication further needs to be performed between the data network and the user equipment; the network function entity obtains an authentication result of the secondary authentication and a restriction condition of the secondary authentication from the data network; and the network function entity stores the obtained authentication result of the secondary authentication and the obtained restriction condition of the secondary authentication into the core network (for example, into the AMF or a UDM or the like in the core network).

The secondary authentication mentioned in the embodiments of this application is essentially authentication between the data network and a user using the user equipment. Because the user equipment may represent, to some extent, the user using the user equipment, the secondary authentication may also be referred to as "secondary authentication between the data network and the user equipment", and certainly, in some cases, may also be referred to as "secondary authentication between the data network and the user using the user equipment" or "secondary authentication between the data network and the user". In the description of the embodiments of this application, these several expressions have the same meaning and can be used interchangeably. Similarly, "secondary authentication for user equipment" and "secondary authentication for a user" may be used interchangeably, and so on.

In addition, meanings of "user terminal", "user equipment", "terminal", and "terminal device" mentioned in the embodiments of this application are the same, and may be used interchangeably.

It can be learned that, in the foregoing example solution, the restriction condition is introduced for the secondary authentication, to make it possible that the authentication result of the secondary authentication is properly restricted for use, and to lay a foundation for effective management of the authentication result of the secondary authentication, thereby helping improve security and effectiveness of operation of a secondary authentication-based service.

In some embodiments, the restriction condition of the secondary authentication may include, for example, a validity period of the authentication result of the secondary authentication and/or an authorization level of the secondary authentication.

In some embodiments, the authentication result of the secondary authentication and an authentication result of the primary authentication are bound for storage (that the authentication result of the secondary authentication and an authentication result of the primary authentication are bound for storage may indicate that validity periods of the authentication result of the secondary authentication and the authentication result of the primary authentication are the same or have a correspondence) or stored separately; or the authentication result of the secondary authentication and a context of the user equipment are bound for storage (that the authentication result of the secondary authentication and a context of the user equipment are bound for storage may indicate that validity periods of the authentication result of the secondary authentication and the context of the user equipment are the same or have a correspondence) or stored separately. Alternatively, the validity period of the secondary authentication is equal to or not equal to (greater than or less than) a validity period of a context of the user equipment, or the validity period of the secondary authentication is equal to or not equal to (greater than or less than) a validity period of the primary authentication.

In some embodiments, that a network function entity in the core network assists a data network in performing secondary authentication between the data network and the user equipment includes: when it is determined that a condition for initiating the secondary authentication for the user equipment is met, the network function entity in the core network assists the data network in performing the secondary authentication between the data network and the user equipment. When it is determined that the condition for initiating the secondary authentication for the user equipment is not met, the core network rejects a request for the secondary authentication for the user equipment or directly determines that the secondary authentication between the data network and the user equipment is not successful.

In some embodiments, the method may further include: the network function entity obtains assistance information of the secondary authentication from the data network, and the network function entity stores the obtained assistance information of the secondary authentication into the core network, where the assistance information can be used to determine a condition for initiating next secondary authentication for the user equipment or another user equipment.

For example, the condition for initiating the secondary authentication may be determined by using previously stored assistance information of secondary authentication that has been performed once or several times for the current UE or another UE. For example, when an operator network performs secondary authentication for another UE (secondary authentication for S-NSSAI), a condition for initiating the secondary authentication is used to assist the AMF in determining whether to continue a secondary authentication procedure or directly determine that the secondary authentication fails. Similarly, if the secondary authentication fails, an authentication failure cause may be provided to the core network, and the authentication failure cause may be used as assistance information of the secondary authentication, which is used next time by the AMF to assist in determining whether the user or another user meets the condition for the secondary authentication (for the S-NSSAI). For example, an AAA-S successfully authenticates and authorizes the user, but a network capacity of a DN or a user quantity supported by the DN reaches an upper limit. The AAA-S may notify the operator network that the DN is temporarily operating in a full load mode and temporarily does not accept more secondary authentication. In this case, the AAA-S may alternatively send a timer, and the timer is used to limit specific duration indicated by "temporarily". After receiving the timer, the AMF stores the timer into the core network (for example, into the AMF or the UDM). When another UE applies for secondary authentication next time, the application for the secondary authentication can be directly rejected, to prevent unnecessary signaling interaction between the core network of the operator and the DN.

In some embodiments, the method further includes: the network function entity sends the obtained authentication result of the secondary authentication and the obtained restriction condition of the secondary authentication to the user equipment. The user equipment can receive and store the authentication result of the secondary authentication and the restriction condition of the secondary authentication.

In some embodiments, the method further includes: when the network function entity receives, from the data network, an update request for requesting to update the restriction condition of the secondary authentication, updating, based on the update request, the restriction condition of the secondary authentication stored in the core network. Further, when the network function entity receives, from the data network, the update request for requesting to update the restriction condition of the secondary authentication, the network function entity may further send the update request to the user equipment. After receiving the update request, the user equipment updates, based on the update request, the restriction condition of the secondary authentication stored by the user equipment.

A second aspect of the embodiments of this application provides a network function entity in a core network. The network function entity may include: an assistance unit, configured to: after primary authentication between the core network and user equipment succeeds, assist a data network in performing secondary authentication between the data network and the user equipment if the secondary authentication further needs to be performed between the data network and the user equipment;

an obtaining unit, configured to obtain an authentication result of the secondary authentication and a restriction condition of the secondary authentication from the data network; and a storage unit, configured to store the obtained authentication result of the secondary authentication and the obtained restriction condition of the secondary authentication into the core network (for example, into an AMF or a UDM in the core network).

It can be learned that, in the foregoing example solution, the restriction condition is introduced for the secondary authentication, to make it possible that the authentication result of the secondary authentication is properly restricted for use, and to lay a foundation for effective management of the authentication result of the secondary authentication, thereby helping improve security and effectiveness of operation of a secondary authentication-based service.

In some embodiments, the restriction condition of the secondary authentication may include, for example, a validity period of the authentication result of the secondary authentication and/or an authorization level of the secondary authentication.

In some embodiments, the authentication result of the secondary authentication and an authentication result of the primary authentication are bound by the storage unit for storage (that the authentication result of the secondary authentication and an authentication result of the primary authentication are bound for storage may indicate that validity periods of the authentication result of the secondary authentication and the authentication result of the primary authentication are the same or have a correspondence) or stored separately; or the authentication result of the secondary authentication and a context of the user equipment are bound by the storage unit for storage (that the authentication result of the secondary authentication and a context of the user equipment are bound for storage may indicate that validity periods of the authentication result of the secondary authentication and the context of the user equipment are the same or have a correspondence) or stored separately. Alternatively, the validity period of the secondary authentication is equal to or not equal to (greater than or less than) a validity period of a context of the user equipment, or the validity period of the secondary authentication is equal to or not equal to (greater than or less than) a validity period of the primary authentication.

In some embodiments, that an assistance unit assists a data network in performing secondary authentication between the data network and the user equipment includes: when it is determined that a condition for initiating the secondary authentication for the user equipment is met, assist the data network in performing the secondary authentication between the data network and the user equipment. In addition, when it is determined that the condition for initiating the secondary authentication for the user equipment is not met, a request for the secondary authentication for the user equipment may be rejected, or it is directly determined that the secondary authentication between the data network and the user equipment is not successful.

In some embodiments, the obtaining unit is further configured to obtain assistance information of the secondary authentication from the data network.

The storage unit is further configured to store the obtained assistance information of the secondary authentication into the core network, where the assistance information can be used to determine a condition for initiating next secondary authentication for the user equipment or another user equipment.

In some embodiments, the network function entity in the core network further includes a notification unit, configured to send the obtained authentication result of the secondary authentication and the obtained restriction condition of the secondary authentication to the user equipment. The user equipment can receive and store the authentication result of the secondary authentication and the restriction condition of the secondary authentication.

In some embodiments, the network function entity in the core network further includes an update unit, configured to: when an update request for requesting to update the restriction condition of the secondary authentication is received from the data network, update, based on the update request, the restriction condition of the secondary authentication stored in the core network.

Further, the notification unit may be further configured to: when the network function entity receives, from the data network, the update request for requesting to update the restriction condition of the secondary authentication, send the update request to the user equipment. After receiving the update request, the user equipment may update, based on the update request, the restriction condition of the secondary authentication stored by the user equipment.

A third aspect of the embodiments of this application provides another communication method, including: an authentication server in a data network performs secondary authentication between the data network and user equipment with the assistance of a core network; and sends an authentication result of the secondary authentication and a restriction condition of the secondary authentication to the core network, where the authentication result of the secondary authentication and the restriction condition of the secondary authentication can be stored by the core network.

In some embodiments, the restriction condition of the secondary authentication may include, for example, a validity period of the authentication result of the secondary authentication and/or an authorization level of the secondary authentication.

In some embodiments, the method may further include: the authentication server sends assistance information of the secondary authentication to the core network, where the assistance information can be stored by the core network, and the assistance information can be used to determine a condition for initiating next secondary authentication for the user equipment or another user equipment.

In some embodiments, the method further includes: the authentication server sends, to the core network, an update request for requesting to update the restriction condition of the secondary authentication, where the update request is used to trigger the core network to update the stored restriction condition of the secondary authentication.

A fourth aspect of the embodiments of this application provides another authentication server in a data network, including:

a secondary authentication unit, configured to perform secondary authentication between the data network and user equipment with the assistance of a core network (such as an AMF); and an interaction unit, configured to send an authentication result of the secondary authentication and a restriction condition of the secondary authentication to the core network (such as the AMF), where the authentication result of the secondary authentication and the restriction condition of the secondary authentication can be stored by the core network.

In some embodiments, the restriction condition of the secondary authentication may include, for example, a validity period of the authentication result of the secondary authentication and/or an authorization level of the secondary authentication.

In some embodiments, the interaction unit is further configured to send assistance information of the secondary authentication to the core network. The assistance information can be stored by the core network, and the assistance information can be used to determine a condition for initiating next secondary authentication for the user equipment or another user equipment.

In some embodiments, the interaction unit is further configured to send, to the core network, an update request for requesting to update the restriction condition of the secondary authentication, where the update request is used to trigger the core network to update the stored restriction condition of the secondary authentication.

A fifth aspect of the embodiments of this application provides a communication method, including: after primary authentication between a core network and user equipment succeeds, the user equipment performs secondary authentication with a data network with the assistance of the core network if the secondary authentication further needs to be performed between the user equipment and the data network; the user equipment receives an authentication result of the secondary authentication and a restriction condition of the secondary authentication that are sent by the core network; and the user equipment stores the received authentication result of the secondary authentication and the received restriction condition of the secondary authentication.

In some embodiments, when the authentication result of the secondary authentication is authentication failure and the restriction condition of the secondary authentication is a validity period of the authentication result, the method further includes: the user equipment re-initiates the secondary authentication with the data network after it is determined that the validity period of the authentication result ends; or the user equipment suspends initiation of the secondary authentication with the data network before it is determined that the validity period of the authentication result ends.

A sixth aspect of the embodiments of this application provides user equipment, including:

an authentication unit, configured to: after primary authentication between a core network and the user equipment succeeds, perform secondary authentication with a data network with the assistance of the core network if the secondary authentication further needs to be performed between the user equipment and the data network;

an interaction unit, configured to receive an authentication result of the secondary authentication and a restriction condition of the secondary authentication that are sent by the core network; and a storage unit, configured to store the received authentication result of the secondary authentication and the received restriction condition of the secondary authentication.

In some embodiments, the authentication unit is further configured to: when the authentication result of the secondary authentication is authentication failure and the restriction condition of the secondary authentication is a validity period of the authentication result, re-initiate the secondary authentication with the data network after it is determined that the validity period of the authentication result ends; or suspend initiation of the secondary authentication with the data network before it is determined that the validity period of the authentication result ends.

In some embodiments, the interaction unit is further configured to receive assistance information of the secondary authentication sent by the core network; and re-initiate the secondary authentication with the data network when it is determined that a condition for initiating the secondary authentication for the user equipment is met; or suspend initiation of the secondary authentication with the data network when it is determined that a condition for initiating the secondary authentication for the user equipment is not met. The assistance information is used to determine a condition for initiating next secondary authentication for the user equipment.

A seventh aspect of the embodiments of this application provides a communication apparatus, where the communication apparatus includes a processor and a memory that are coupled. The processor is configured to invoke a computer program stored in the memory, to implement some or all of the steps of any method provided in the embodiments of this application.

The communication apparatus may be, for example, user equipment, an authentication server in a data network, or a network function entity (such as an AMF) in a core network.

An eighth aspect of the embodiments of this application provides a computer-readable storage medium, where the computer-readable storage medium stores a computer program, and when the computer program is executed by a processor, some or all of the steps of any method provided in the embodiments of this application can be implemented.

A ninth aspect of the embodiments of this application further provides a computer program product including instructions. When the computer program product is run on a computer device, the computer device is enabled to perform some or all of the steps of any method performed by any device provided in the embodiments of this application.

BRIEF DESCRIPTION OF DRAWINGS

FIG. 2-A is a schematic diagram of secondary authentication according to an embodiment of this application;

FIG. 2-B is a schematic diagram of an authentication procedure according to an embodiment of this application;

DESCRIPTION OF EMBODIMENTS

The terms "include", "have", and any other variant thereof in the specification, claims, and accompanying drawings of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In addition, in the specification, claims, and accompanying drawings of this application, the terms "first", "second", "third", "fourth", and the like are intended to distinguish between different objects but do not indicate a particular order.

The following first describes a related network architecture.

Figure 1:
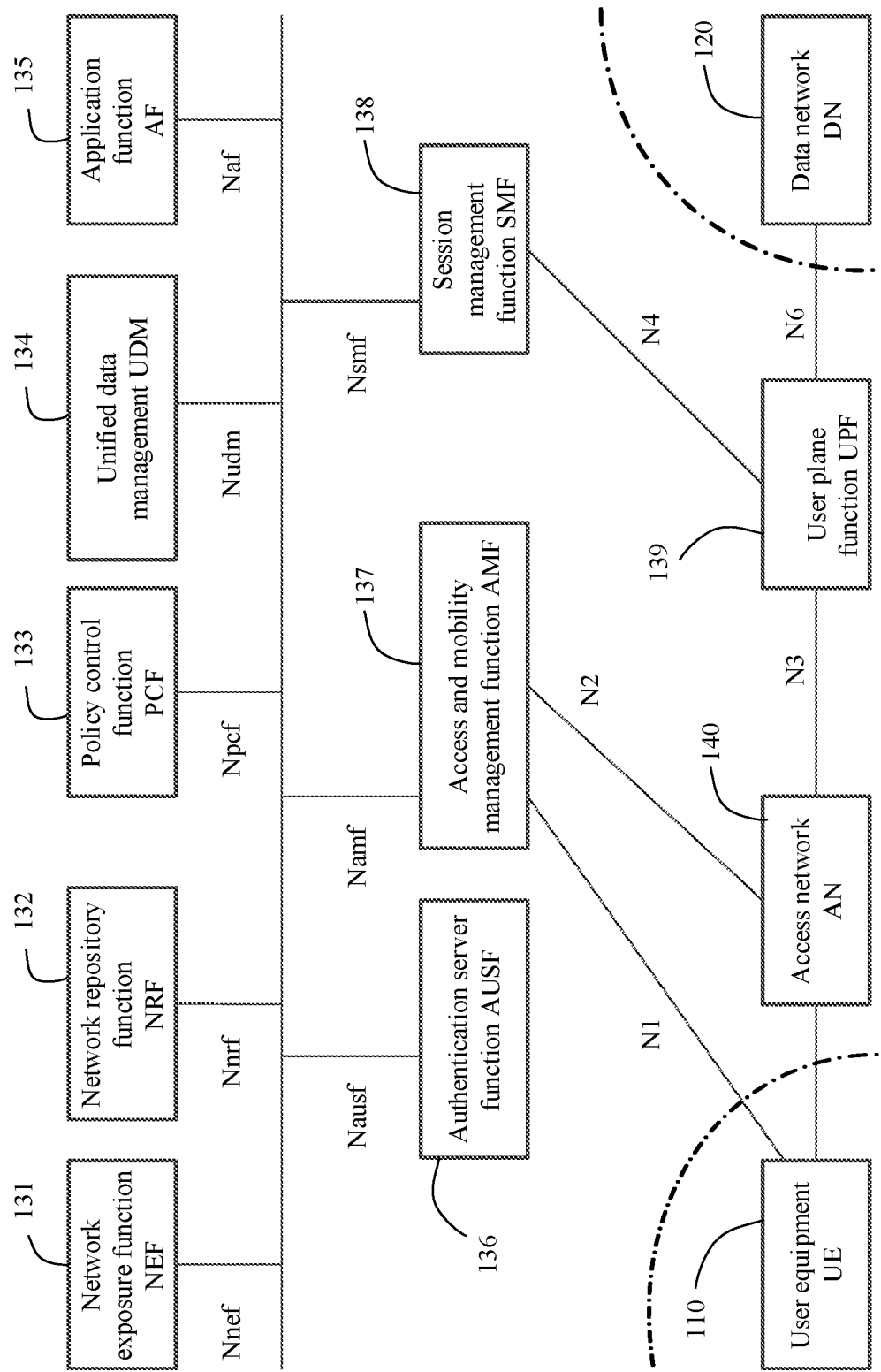
FIG. 1 is a schematic diagram of a network architecture according to an embodiment of this application.

FIG. 1 is a schematic diagram of a 5G network architecture according to an embodiment of this application. In a 5G network, some network function entities (such as a mobility management entity (MME)) in a 4G network are split to a particular extent, and an architecture based on a service-oriented architecture is defined. In the network architecture shown in FIG. 1, a function similar to the MME in the 4G network is split into an access and mobility management function (AMFa session management function (SMF), and the like.

Other related network functions/entities are described below.

A user terminal (or referred to as user equipment (UE), a terminal device, a terminal, or the like) accesses a data network (DN), or the like by accessing an operator network, and then uses a service provided by an operator or a third party on the DN.

The access and mobility management function (AMF) is a control plane network function in a 3GPP network and is mainly responsible for access control and mobility management for UE that accesses the operator network. A security anchor function (SEAF) may be deployed in the AMF, or the SEAF may be deployed in another device different from the AMF. In FIG. 1-A, an example in which the SEAF is deployed in the AMF is used.

The session management function (SMF) is a control plane network function in the 3GPP network. The SMF is mainly responsible for managing packet data unit (PDU) sessions of the UE. A PDU session is a channel used to transmit a PDU, and the UE and the DN may send a PDU to each other by using a PDU session. The SMF is responsible for management tasks such as establishment, maintenance, and deletion of the PDU session.

The data network (DN) is also referred to as a packet data network (PDN), and is a network usually located outside the 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of UE, and a control server of the sensor is deployed in the DN. The UE communicates with the control server. After obtaining instructions from the control server, the UE may transfer collected data to the control server according to the instructions. For another example, a DN is an internal office network of a company, a terminal used by an employee of the company may play a role of UE, and the UE may access internal information and other resources of the company.

A unified data management (UDM) network function is a control plane network function in the 3GPP network, and the UDM is mainly responsible for storing subscription data, a credential, a subscriber permanent identifier (SUPI and the like of a subscriber in the 3GPP network. The data may be used for authentication and authorization when the UE accesses a 3GPP network of an operator.

An authentication server function (AUSF) is also a control plane network function in the 3GPP network. The AUSF is mainly used for primary authentication (to be specific, authentication between the 3GPP network and a terminal of a subscriber).

A network exposure function (NEF) is also a control plane network function in the 3GPP network. The NEF is mainly responsible for exposing external interfaces of the 3GPP network to third parties in a secure manner. When a network function such as the SMF needs to communicate with a third-party network function, the NEF can be used as a communication relay.

A network repository function (NRF) is also a control plane network function in the 3GPP network, and is mainly responsible for storing a configuration service profile of an accessible network function (NF), and providing a network function discovery service for other network functions.

A user plane function (UPF) is a gateway for communication between the 3GPP network and the DN.

A policy control function (PCF) is a control plane function in the 3GPP network, and is configured to provide a policy of a PDU session for the SMF. The policy may be a policy related to charging, quality of service (QoS), authorization, and the like.

An access network (AN) is a sub-network of the 3GPP network. To access the 3GPP network, the UE first needs to access the AN. In a radio access scenario, the AN is also referred to as a radio access network (RAN). Therefore, terms "RAN" and "AN" are usually used interchangeably.

The 3GPP network is a network that complies with 3GPP specifications. In FIG. 1, parts other than the UE and the DN may be considered as a 3GPP network. The 3GPP network is not limited to a 5G network defined by the 3GPP, but may further include a 2G network, a 3G network, and a 4G network. Usually, the 3GPP network is operated by an operator. In addition, N1, N2, N3, N4, N6, and the like in the architecture shown in FIG. 1 respectively represent reference points (Reference Point) between related network functions. Nausf, Namf, and the like respectively represent service-oriented interfaces of related network functions.

A mobility management network function in the embodiments of this application may be the AMF shown in FIG. 1, or may be another network function that has an AMF function in a future communication system. Alternatively, the mobility management network function in this application may be an MME in long term evolution (LTE).

For ease of description, in the embodiments of this application, the AMF is used as an example of the mobility management network function for description. In addition, the user terminal, user equipment, terminal device or terminal can be collectively referred to as UE. In other words, unless otherwise specified, the AMF described later in the embodiments of this application may be replaced with the mobility management network function, and the UE may be replaced with the user terminal, user equipment, terminal device, or terminal.

The network architecture (for example, a 5G network architecture) shown in FIG. 1 uses a service-based architecture and general-purpose interfaces. A conventional network element function is divided based on a network functions virtualization (NFVtechnology into several self-included, self-management and reusable network function service modules. Customized network function reconstruction can be implemented by flexibly defining service module sets, and a service procedure is formed by providing a unified service invocation interface to the outside. The schematic diagram of the network architecture shown in FIG. 1 may be understood as a schematic diagram of a service-based 5G network architecture in a non-roaming scenario. In the architecture, different network functions are combined in order based on a requirement in a specific scenario, so that a network capability and a network service can be customized, to deploy dedicated networks for different services, and implement 5G network slicing. The technology of network slicing may enable the operator to more flexibly and quickly respond to customer requirements and support flexible assignment of network resources.

Network slicing is briefly understood as that a physical network of an operator is sliced into a plurality of virtual end-to-end networks. These virtual networks, including devices, and access, transport, and core networks in the networks, are logically independent, and a fault occurring on any virtual network does not affect any other virtual network.

Currently, various scenarios have different requirements on a 3rd Generation Partnership Project (3GPP) ecosystem, such as charging, policy, security, and mobility requirements. The 3GPP emphasizes that network slices do not affect each other. For example, a large quantity of burst meter reading services should not affect normal mobile broadband services. To meet diversified requirements and slice isolation, independent management and operation and maintenance are required for services, and customized service functions and analysis capabilities are provided. Instances of different service types may be deployed on different network slices, and different instances of a same service type may also be deployed on different network slices.

A slice in the 5G network is a virtual private network including a group of network functions and a sub-network. For example, the sub-network RAN 140, the AMF network function 137, the SMF network function 138, and the UPF network function 139 in FIG. 1 may form a slice. Only one network function is schematically drawn in FIG. 1 for each type of network function, but in actual network deployment, there may be a plurality of (for example, several, tens or hundreds, or even more) network functions or sub-networks for each type of network function or sub-network. Many network slices can be deployed on an operator network. All slices may have different performance to meet requirements of different applications and vertical industries. The operator may "customize" a slice based on requirements of customers from different vertical industries. In addition, an operator may also allow some industry customers to have greater autonomy, to participate in some slice management and control functions. Slice-level authentication is a network control function in which industry customers participate, that is, to authenticate and authorize access to a slice by user equipment, and may be briefly referred to as "slice authentication" in the embodiments of this application.

FIG. 1 is used as an example. When a network slice is deployed in the core network CN, if UE 110 needs to access a particular network slice, the UE 110 can provide the core network with a requested network slice. For example, the network slice requested by the UE 110 may be represented by, for example, a requested network slice set, or the requested network slice may be represented by requested network slice selection assistance information (requested NSSAI). The network slice set includes one or more network slices. The requested NSSAI is represented by and includes one or more pieces of single network slice selection assistance information (S-NSSAI). Each piece of S-NSSAI is used to identify a network slice type. It may also be understood that the S-NSSAI is used to identify a network slice, or it may be understood that the S-NSSAI is identification information of a network slice.

For ease of understanding, in later descriptions, "network slice" and "S-NSSAI" are not strictly distinguished in the embodiments of this application, and may be used interchangeably. The "network slice" in the embodiments of this application may also be referred to as a "slice" or a "network slice instance", and the three have a same meaning. A unified description is provided herein. Details are described below.

After the UE 110 sends a registration request to a network, the network function (such as the AMF network function 137 or an NSSF network function) in the core network performs comprehensive determining based on information such as subscription data of the UE 110, the requested NSSAI of the UE 110, a roaming agreement, and a local configuration, to further select, for the UE 110, a set of network slices allowed to be accessed. The set of network slices allowed to be accessed may be represented by allowed NSSAI, and all pieces of S-NSSAI included in the allowed NSSAI are S-NSSAI allowed, by the current operator network, to be accessed.

Before being allowed to access the network or a network slice, the UE 110 performs two-way authentication with the network and/or the network slice and obtains authorization from the network and/or the network slice. Currently, in a 5G standard, the operator network directly performs authentication and authorization on the UE 110, and this type of authentication and authorization is referred to as primary authentication (primary authentication).

With development of the vertical industries and the internet of things, authentication and authorization will be also required for the UE 110 that accesses the data network (DN) 120 (for example, a DN serving the vertical industries) that is external to the operator network. For example, a commercial company provides a game platform to provide game services for players through the operator network. Because the UE 110 used by a player accesses the game platform through the operator network, the operator network needs to perform authentication and authorization, namely, primary authentication, on the UE 110. The game player is a customer of the commercial company, and the commercial company also needs to authenticate and authorize the game player. If this authentication is based on a network slice, or this authentication is based on slices, this authentication can be referred to as slice authentication, or slice-specific authentication, or secondary authentication.

It should be noted that, in the embodiments of this application, the secondary authentication may also be referred to as slice-specific secondary authentication or slice authentication, or identity authentication for a user (a user using the UE 110). A meaning of the secondary authentication is, for example, secondary authentication performed between the UE 110 (or the user using the UE 110) and a third-party network, where an authentication result of the secondary authentication determines whether the operator network authorizes the UE to access a corresponding slice. It should be further understood that the method applied to the secondary authentication in the embodiments of this application is also applicable to a scenario such as session-specific secondary authentication or slice-specific secondary authentication. Details are not described herein.

The secondary authentication mentioned in the embodiments of this application is essentially authentication between a data network and a user using the user equipment. Because the user equipment may represent, to some extent, the user, the secondary authentication may also be referred to as "secondary authentication between the data network and the user equipment", and certainly, in some cases, may also be referred to as "secondary authentication between the data network and the user using the user equipment". In the embodiments of this application, these two expressions have the same meaning and can be used interchangeably. Similarly, "secondary authentication for user equipment" and "secondary authentication for a user" may be used interchangeably, and so on.

FIG. 2-A shows manners of primary authentication and slice authentication by using an example.

For example, FIG. 2-A shows an authentication procedure between UE and a network. The authentication procedure between the UE and the network includes a primary authentication procedure and a secondary authentication procedure. The primary authentication procedure is an authentication process between the UE and an operator network, and the secondary authentication procedure is an authentication process between the UE or a user (user) using the UE and a third-party network.

In this embodiment of this application, the description of "secondary authentication process between the UE and a third-party network" may be understood as a secondary authentication process between a user using the UE and the third-party network. As shown in FIG. 2-A, for example, the primary authentication procedure is an authentication process between UE 210 and a core network (CN) 230, and the secondary authentication procedure is an authentication process between a user using the UE 210 and a data network (DN) 220. Both the primary authentication procedure and the secondary authentication procedure may be understood as a part of a registration procedure of the UE 110. To facilitate understanding and description, in this embodiment of this application, an authentication, authorization, and accounting (AAA) server is used as an example of an authentication device in the DN 220 for description. The AAA server may be represented as an AAA-S (AAA server), and an AAA proxy function (AAA-P) 238 may be located in the core network CN 230 and forward a message sent by the core network to the AAA-S. The AAA-P is an optional implementation, and is not limited in this embodiment of this application. It should be further noted that the AAA-S is usually deployed on the DN side outside a 3GPP network, but the DN 220 or the AAA-S 221 may alternatively be deployed inside the 3GPP network. This is not limited in this embodiment of this application.

Refer to FIG. 2-B. Main steps of a registration procedure of UE 210 may be as follows:

201. The UE sends, to a network, a registration request for requesting access to the network, where the registration request carries identity information of the UE. For example, the UE 210 may send, to an AMF network function entity 237 in a core network CN 230, an access request carrying the identity information of the UE 210, where the identity information is specifically, for example, a subscription concealed identifier SUCI or temporary identity information such as a globally unique temporary identity (GUTI).

The network determines, based on the identity information of the UE carried in the registration request sent by the UE, whether to initiate primary authentication between the network and the UE. For example, the AMF network function entity 237 may forward the encrypted identity information (the SUCI) received from the UE 210 to a UDM network function entity 234, and the UDM network function entity 234 decrypts and restores the SUCI to obtain real identity information (an SUPI) of the UE 210, and then returns the SUPI to the AMF network function entity 237. The AMF network function entity 237 initiates a primary authentication procedure between the network and the UE 210 based on the real identity information (the SUPI) of the UE 210.

After the primary authentication between the UE and the network succeeds, the network may authorize the UE to access an operator network. Specifically, for example, after the primary authentication succeeds, the AMF network function entity 237 authorizes the UE 210 to access the operator network.

After step 201, it may be considered that the primary authentication process between the UE and the network is completed. In addition, if the UE sends the temporary identity information (the GUTI) in step 201, the AMF checks validity of the GUTI on a side of the network in step 201. If the GUTI is valid, it indicates that the previous primary authentication is still valid, and primary authentication does not need to be performed.

202. The network determines whether the UE further needs to perform secondary authentication. For example, the AMF network function entity 237 determines, based on local information of the AMF network function entity 237 or information about the UDM network function entity 234, whether slice authentication (namely, the secondary authentication) further needs to be performed on a slice to which the UE 210 applies for access.

203. If the UE needs to perform the secondary authentication, the network, for example, may trigger a secondary authentication procedure between the UE and a data network DN. For example, when the UE 210 needs to perform the secondary authentication, the AMF network function entity 237 triggers a secondary authentication procedure between the UE 210 and the DN 220.

In this embodiment of this application, the slice authentication is used as an example of the secondary authentication. This slice authentication procedure may be based on an extensible authentication protocol (EAP) standard formulated by the standards organization International Internet Engineering Task Force (IETF) as a basic authentication mechanism. The EAP mechanism has great flexibility and can support dozens of specific EAP authentication methods.

It should be understood that, that the UE needs to perform the secondary authentication as mentioned in this embodiment of this application may be understood as that a user using the UE needs to perform the secondary authentication. Slice authentication is used as an example of the secondary authentication, and that the UE 210 needs to perform the secondary authentication may be understood as that a user using the UE 210 needs to perform the secondary authentication.

203. The UE 210 completes the secondary authentication with the data network by through a plurality of rounds of signaling interaction, and the data network notifies the operator network of a result of the secondary authentication. The operator network continues to perform other procedures based on a result of the secondary authentication, for example, continues to perform a remaining registration procedure, a registration termination procedure, or another related procedure, which are not listed one by one herein.

For example, slice authentication is used as an example of the secondary authentication. During the secondary authentication between a user of the UE 210 and the DN 220, a plurality of rounds of signaling interaction are required to complete the slice authentication. The DN 220 may obtain user identity information subscribed between the UE 110 and the DN 220, namely, the foregoing identity information of a user using the UE 210. For ease of description, the identity information of the user is referred to as a DN user identity (DUI) in this embodiment of this application. In some embodiments, the identity information of the user may also be referred to as a user ID. The user ID used for the secondary authentication belongs to information about subscription between the terminal device and an external network that is different from the operator network. The operator network may not necessarily have the information.

The example shown in FIG. 2-A is used. The UE 210 sends the DUI to the AMF 237 in the core network CN 230, and the AMF 237 may forward the DUI to an authentication device (for example, an AAA-S 221 shown in the figure) in the DN 220. After the secondary authentication succeeds, the authentication device in the DN 220 notifies the AMF 237 of the result of the secondary authentication. It should be noted that, in some embodiments, the DUI is placed into a message container (container) and sent to the AMF, and the AMF directly forwards the container to the DN, which is so-called "transparent transmission". In this case, the AMF does not parse the DUI in the container, that is, the AMF does not know the DUI of the user. In addition, in some embodiments, the DUI may be forwarded from the AMF network function entity 237 to the authentication device in the DN 220 by using an AAA-P 238. Herein, the primary authentication procedure between the UE 210 and the network and the secondary authentication procedure are completed, and the operator network may further continue to perform other registration procedures of the UE 210.

The secondary authentication process between the UE and the data network mentioned above may be based on the EAP authentication mechanism, where the EAP authentication mechanism can support dozens of specific EAP authentication methods. For a same data network, different UEs may support different or same EAP authentication methods. For different data networks, same UE may support different or same EAP authentication methods. Different data networks may support different or same EAP authentication methods.

One UE may support one or more EAP authentication methods, and one data network may support one or more EAP authentication methods. During secondary authentication between the UE and the data network, an EAP authentication method supported by both the UE and the data network is used. It should be understood that, in this embodiment of this application, the EAP authentication method supported by the data network may also be understood as an EAP authentication method supported by an authentication device that is in the data network. Meanings of the two expressions are the same, and no strict distinction is made in this embodiment of this application.

Figure 3:
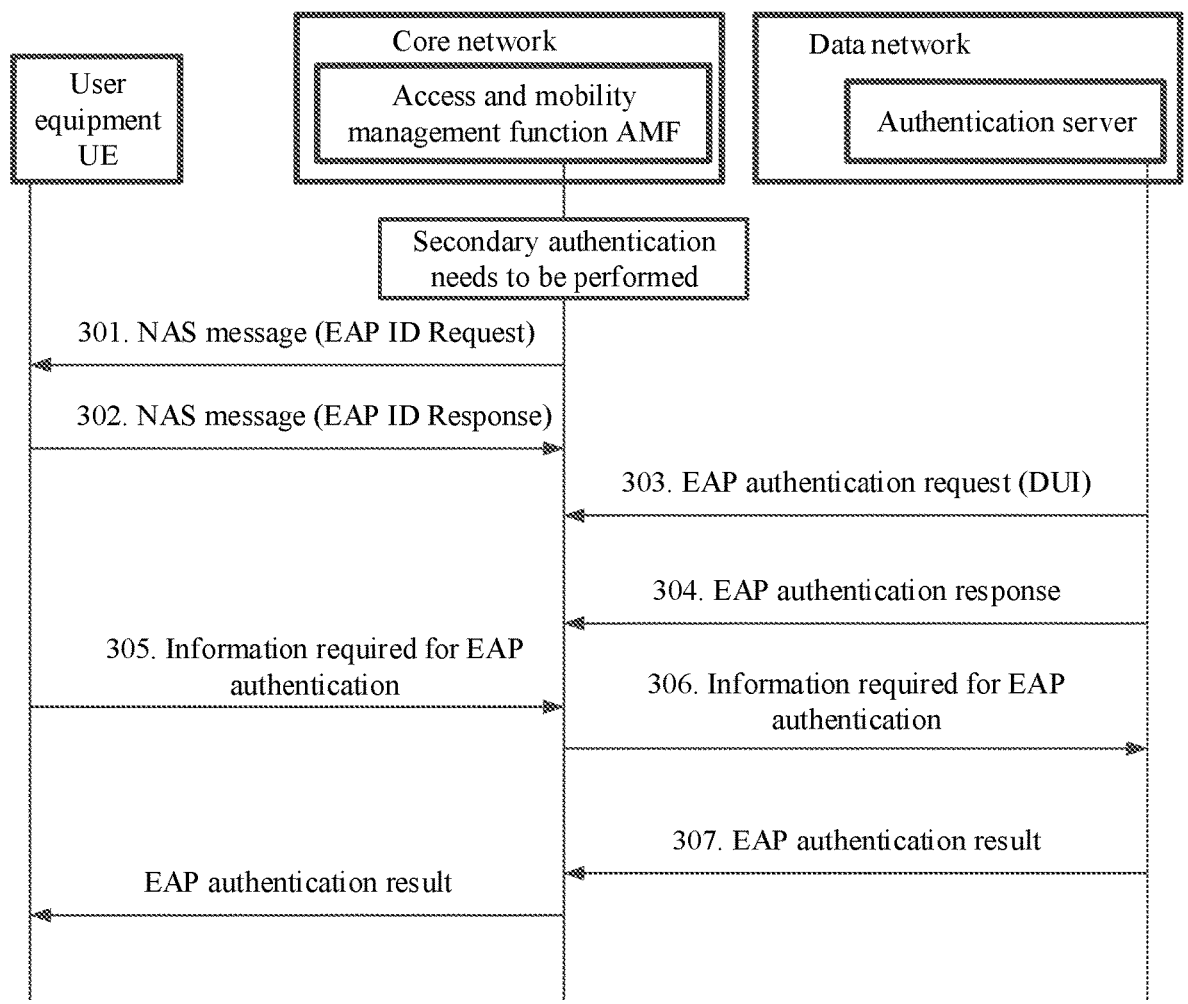
FIG. 3 is a schematic flowchart of secondary authentication according to an embodiment of this application.

To understand a process of the secondary authentication (such as the slice authentication) in more detail, the foregoing step 203 is further described below by using a schematic diagram of signaling interaction processes before and after the secondary authentication. FIG. 3 schematically shows a partial process of a secondary authentication procedure between UE and an AAA-S in a data network. It should be understood that a secondary authentication procedure between the UE and the data network (including the AAA-S) further includes other steps such as establishing a connection between a network and the AAA-S and details of an EAP authentication procedure. For simplicity of description, details are not provided herein.

FIG. 3 shows a partial procedure of secondary authentication by using an example.

301. When an AMF determines that UE needs to perform the secondary authentication and initiate the secondary authentication, the AMF sends, to the UE, a NAS message that can be used to initiate the secondary authentication. In this case, the UE has completed primary authentication with a core network, and therefore the NAS message sent by the AMF to the UE is encrypted and protected for integrity. This NAS message includes EAP ID request information, and requesting the UE to perform the secondary authentication requires use of a user ID (the DUI mentioned in step 206).

302. The UE returns a NAS response message to the AMF, where the returned NAS response message carries EAP ID response information, and is used to send user ID information (the DUI) requested in step 301.

It should be noted that step 301 and step 302 are optional steps, because not all EAP authentication procedures require use of the DUI or require sending of the DUI through an EAP procedure. It should be further noted that in addition to EAP information, the NAS message may further include other related information, such as S-NSSAI, which is not limited herein.

303. The AMF sends an EAP authentication request to the AAA-S, where the EAP authentication request carries DUI information (if step 301 and step 302 are performed). Optionally, the EAP authentication request is forwarded by network functions such as an AUSF and/or an AAA-P. It should be noted that there is no limitation on whether the message is forwarded through these network functions or on a message or a message type in which the information is carried for forwarding, or the like. Optionally, the message sent by the AMF to the AAA-S may further include other related information such as a GPSI, which is not limited herein.

304. The AAA-S sends an EAP authentication response to the AMF. Similar to step 303, optionally, the EAP authentication response is forwarded by network functions such as the AUSF and/or the AAA-P. Similarly, there is no limitation on a message or a message type in which the information is carried for forwarding, or on other related sent information such as a GPSI.

305. The UE continues to send information required for EAP authentication to the AMF. Similar to step 303, the information is carried by the NAS message after encryption and integrity protection. This NAS message may further carry other related information.

306. The AMF sends the information required for the EAP authentication to the AAA-S. Similar to step 304, a network function for forwarding the information, a message in which the information is carried, other related information, and the like are not limited.

It should be noted that information exchange similar to that in steps 305 and 306 may be performed for a plurality of times, and a quantity of interaction times depends on factors such as a used EAP method and whether retransmission is required, which is not limited herein.

307. Based on the foregoing information exchange, the AAA-S can obtain/determine a result of the EAP authentication, namely, authentication success or failure. The AAA-S sends the authentication result to the AMF to complete the EAP authentication procedure in the secondary authentication. A sending manner is similar to that of step 304, and details are not described herein again.

In the foregoing example manner of the secondary authentication, after the secondary authentication succeeds, a condition for using the successful secondary authentication is not specifically limited. For example, there is no limitation on a validity period of the successful secondary authentication. This imposes a potential risk on network security and/or network operation efficiency. Specifically, examples are as follows:

In one aspect, the validity period is not limited for the result of the secondary authentication, and a network may consider that the result of the secondary authentication is "permanently valid". For example, the result of the successful secondary authentication becomes invalid only after a user ID (DUI) or a terminal ID (SUPI) is revoked by the DN (AAA-S) or an operator network.

In another aspect, if the result of the secondary authentication is stored as a security context of a terminal in the network (for example, the AMF), it means that the result of the secondary authentication is bound to a result of the primary authentication. When the primary authentication fails or the UE context fails, the result of the slice authentication becomes invalid accordingly.

In still another aspect, if the result of the secondary authentication is stored as a context of a terminal in the network (for example, the AMF), it means that the result of the secondary authentication is bound to a status of registration of the terminal with the network. As long as the context of the terminal exists, the result of the slice authentication is valid for a long time, and in this case, it is not possible to indicate that different pieces of S-NSSAI may have different validity periods of secondary authentication.

In addition, there are no other restrictions on the result of the secondary authentication. For example, there is no restriction on an "allowed access" level (similar to authorization levels such as "platinum", "gold", and "silver" in commercial services or games). For another example, there is no specific restriction on whether "allowed access" is valid in different modes. Specifically, for example, whether access is restricted when the network needs overload protection.

The foregoing technical problems may respectively have different negative impacts on the network. Specifically, examples are as follows:

Because a user/terminal ID revocation event is a processing event of abnormal behavior, in normal cases, after the secondary authentication succeeds, it is equivalent to "permanent" authorization. Such long-term valid authentication and authorization can greatly increase security risks of unauthorized user access to slices. For example, if a user and a terminal are not bound, after obtaining user name information, an attacker can use a legitimate terminal to access a slice without authentication (it is assumed that the user has passed the secondary authentication). Further, if a user and a terminal have a binding relationship, an attacker can embezzle a SIM card on another legitimate terminal (such as, SIM card embezzlement, loss, theft, clone, or the like) to first pass the primary authentication, and then directly access a slice without the secondary authentication because the terminal has ever passed the secondary authentication and the authentication result is valid for a long time. If the secondary authentication has validity, such risks are greatly reduced. In addition, there is no time restriction on the secondary authentication, so that the network cannot effectively provide a time-limited access service. If a procedure of first authentication and then revocation is used to complete time-limited access, abuse of a revocation procedure is caused, increasing consumption of network resources. When a user quantity increases, such waste of network resources increases significantly.

If the result of the secondary authentication is bound to the result of the primary authentication by default, to implicitly restrict the validity of the secondary authentication, other problems may arise. First, this may cause difficulty in setting a validity period of a security context of the primary authentication. In one aspect, if the validity period of the primary authentication is set to be excessively long, it brings relatively great security risks to the security context of the primary authentication. Generally, a longer validity period of the security context indicates a longer time left for a potential attacker to attack, which means lower security. Further, if the context of the UE is retained in the AMF for a longer time, a storage capacity requirement for the AMF is also higher. Therefore, usually a proper validity period is set for the context of the UE and the security context of the UE by an operator according to its network conditions and comprehensive security considerations. In another aspect, if the validity period of the primary authentication is set to be excessively short, frequent slice authentication is caused because the UE supports a plurality of types of slice authentication and time points for sending slice authentication requests are not fixed. For example, if a slice authentication request occurs when the context (or security) context of the primary authentication is about to expire, the result of the slice authentication will soon become invalid, causing repeated unnecessary slice authentication. Especially, EAP mechanism-based slice authentication requires a plurality of rounds of long-chain (from the terminal to the operator network and then to an external DN) network interaction, resulting in significant waste of network resources. When the network needs to support (a) a single-UE multi-user scenario and (b) a single-user multi-UE scenario, the problem becomes severer, and various application scenarios cannot be effectively supported in terms of resources.

If the validity period of the secondary authentication is implicitly restricted by using the result of the secondary authentication and the validity of the context of the UE, the problem depends on a value of the validity period of the context of the UE. If the validity period is excessively long, there are also similar security risks and/or relatively high storage resource requirements. If the validity period is excessively short, there is also a problem of frequent secondary authentication. Further, because the UE supports secondary authentication for a plurality of pieces of S-NSSAI, different pieces of S-NSSAI may have different validity periods of authentication and authorization. Such a method cannot be used to implement differentiated validity periods (the context of the UE is used as a unified validity period).

There are no other restrictions on the result of the secondary authentication, and it is difficult to effectively provide various application services, and to effectively support network operation and resource allocation optimization.

The following discusses a mechanism for adding a restriction condition of the secondary authentication. For example, the validity period of the secondary authentication is added, a procedure for and storage of the validity period are optimized, and another restriction condition such as a level or a mode is added. Specifically, for example, the following are optimized: a storage manner of the result of the secondary authentication, whether the result of the secondary authentication is bound to the security context of the UE, and whether a separate user-level (security) context is established. The restriction condition of the authentication result includes, but is not limited to, the validity period, authentication and authorization levels, authentication and authorization operation modes, and the like.

The following gives further descriptions with examples by using some specific embodiments.

Figure 4:
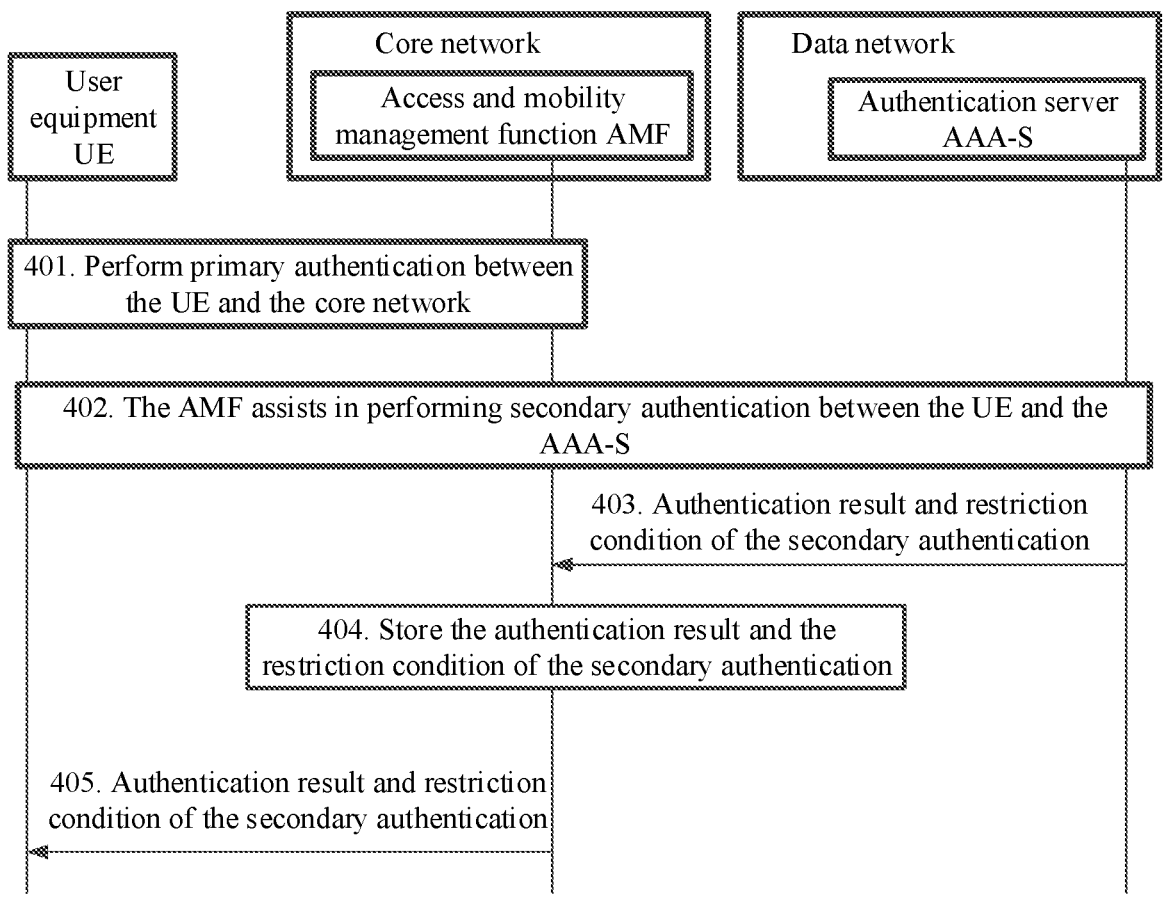
FIG. 4 is a schematic flowchart of a communication method according to an embodiment of this application.

FIG. 4 is a schematic flowchart of a communication method according to an embodiment of this application.

401. Perform primary authentication between a core network and user equipment.

402. After the primary authentication between the core network and the user equipment succeeds, a network function entity (such as an AMF) in the core network assists a data network in performing secondary authentication between the data network and the user equipment if the secondary authentication further needs to be performed between the data network and the user equipment.

The secondary authentication mentioned in this embodiment of this application is essentially authentication between the data network and a user using the user equipment. Because the user equipment may represent, to some extent, the user using the user equipment, the secondary authentication may also be referred to as "secondary authentication between the data network and the user equipment", and certainly, in some cases, may also be referred to as "secondary authentication between the data network and the user using the user equipment" or "secondary authentication between the data network and the user". In the description of this embodiment of this application, these several expressions have the same meaning and can be used interchangeably. Similarly, "secondary authentication for user equipment" and "secondary authentication for a user" may be used interchangeably, and so on.

In addition, meanings of "user terminal", "user equipment", "terminal", and "terminal device" mentioned in this embodiment of this application are the same, and may be used interchangeably.

403. Perform the secondary authentication between the data network and the user equipment, and an authentication server in the data network sends an authentication result of the secondary authentication and a restriction condition of the secondary authentication to the core network.

In some embodiments, the restriction condition of the secondary authentication may include, for example, a validity period of the authentication result of the secondary authentication and/or an authorization level of the secondary authentication.

404. After the network function entity obtains the authentication result of the secondary authentication and the restriction condition of the secondary authentication from the data network, the network function entity stores the obtained authentication result of the secondary authentication and the obtained restriction condition of the secondary authentication into the core network (for example, into the AMF or a UDM in the core network).

405. The network function entity sends the obtained authentication result of the secondary authentication and the obtained restriction condition of the secondary authentication to the user equipment. The user equipment can receive and store the authentication result of the secondary authentication and the restriction condition of the secondary authentication.

It can be learned that, in the foregoing example solution, the restriction condition is introduced for the secondary authentication, to make it possible that the authentication result of the secondary authentication is properly restricted for use, and to lay a foundation for effective management of the authentication result of the secondary authentication, thereby helping improve security and effectiveness of operation of a secondary authentication-based service.

In some embodiments, the authentication result of the secondary authentication and an authentication result of the primary authentication are bound for storage (that the authentication result of the secondary authentication and an authentication result of the primary authentication are bound for storage may indicate that validity periods of the authentication result of the secondary authentication and the authentication result of the primary authentication are the same or have a correspondence) or stored separately; or the authentication result of the secondary authentication and a context of the user equipment are bound for storage (that the authentication result of the secondary authentication and a context of the user equipment are bound for storage may indicate that validity periods of the authentication result of the secondary authentication and the context of the user equipment are the same or have a correspondence) or stored separately. Alternatively, the validity period of the secondary authentication is equal to or not equal to (greater than or less than) a validity period of a context of the user equipment, or the validity period of the secondary authentication is equal to or not equal to (greater than or less than) a validity period of the primary authentication.

In some embodiments, that a network function entity in the core network assists a data network in performing secondary authentication between the data network and the user equipment includes: when it is determined that a condition for initiating the secondary authentication for the user equipment is met, the network function entity in the core network assists the data network in performing secondary authentication between the data network and the user equipment. When it is determined that the condition for initiating the secondary authentication for the user equipment is not met, the core network rejects a request for the secondary authentication for the user equipment or directly determines that the secondary authentication between the data network and the user equipment is not successful.

In some embodiments, the method may further include: the network function entity obtains assistance information of the secondary authentication from the data network, and the network function entity stores the obtained assistance information of the secondary authentication into the core network, where the assistance information can be used to determine a condition for initiating next secondary authentication for the user equipment or another user equipment.

For example, the condition for initiating the secondary authentication may be determined by using previously stored assistance information of secondary authentication that has been performed once or several times for the current UE or another UE. For example, when an operator network performs secondary authentication for another UE (secondary authentication for S-NSSAI), a condition for initiating the secondary authentication is used to assist the AMF in determining whether to continue a secondary authentication procedure or directly determine that the secondary authentication fails. Similarly, if the secondary authentication fails, an authentication failure cause may be provided to the core network, and the authentication failure cause may be used as assistance information of the secondary authentication, which is used next time by the AMF to assist in determining whether the user or another user meets the condition for the secondary authentication (for the S-NSSAI). For example, an AAA-S successfully authenticates and authorizes the user, but a network capacity of the DN or a user quantity supported by the DN reaches an upper limit. The AAA-S may notify the operator network that the DN is temporarily operating in a full load mode and temporarily does not accept more secondary authentication. In this case, the AAA-S may alternatively send a timer, and the timer is used to limit specific duration indicated by "temporarily". After receiving the timer, the AMF stores the timer into the core network (for example, into the AMF or the UDM). When another UE applies for secondary authentication next time, the application for the secondary authentication can be directly rejected, to prevent unnecessary signaling interaction between the core network of the operator and the DN.

In some embodiments, when the authentication result of the secondary authentication is authentication failure and the restriction condition of the secondary authentication is a validity period of the authentication result, the method further includes: the user equipment re-initiates the secondary authentication with the data network after it is determined that the validity period of the authentication result ends; or the user equipment suspends initiation of the secondary authentication with the data network before it is determined that the validity period of the authentication result ends.

In some embodiments, the method further includes: when the network function entity receives, from the data network, an update request for requesting to update the restriction condition of the secondary authentication, updating, based on the update request, the restriction condition of the secondary authentication stored in the core network. Further, when the network function entity receives, from the data network, the update request for requesting to update the restriction condition of the secondary authentication, the network function entity may further send the update request to the user equipment. After receiving the update request, the user equipment updates, based on the update request, the restriction condition of the secondary authentication stored by the user equipment.

Figure 5:
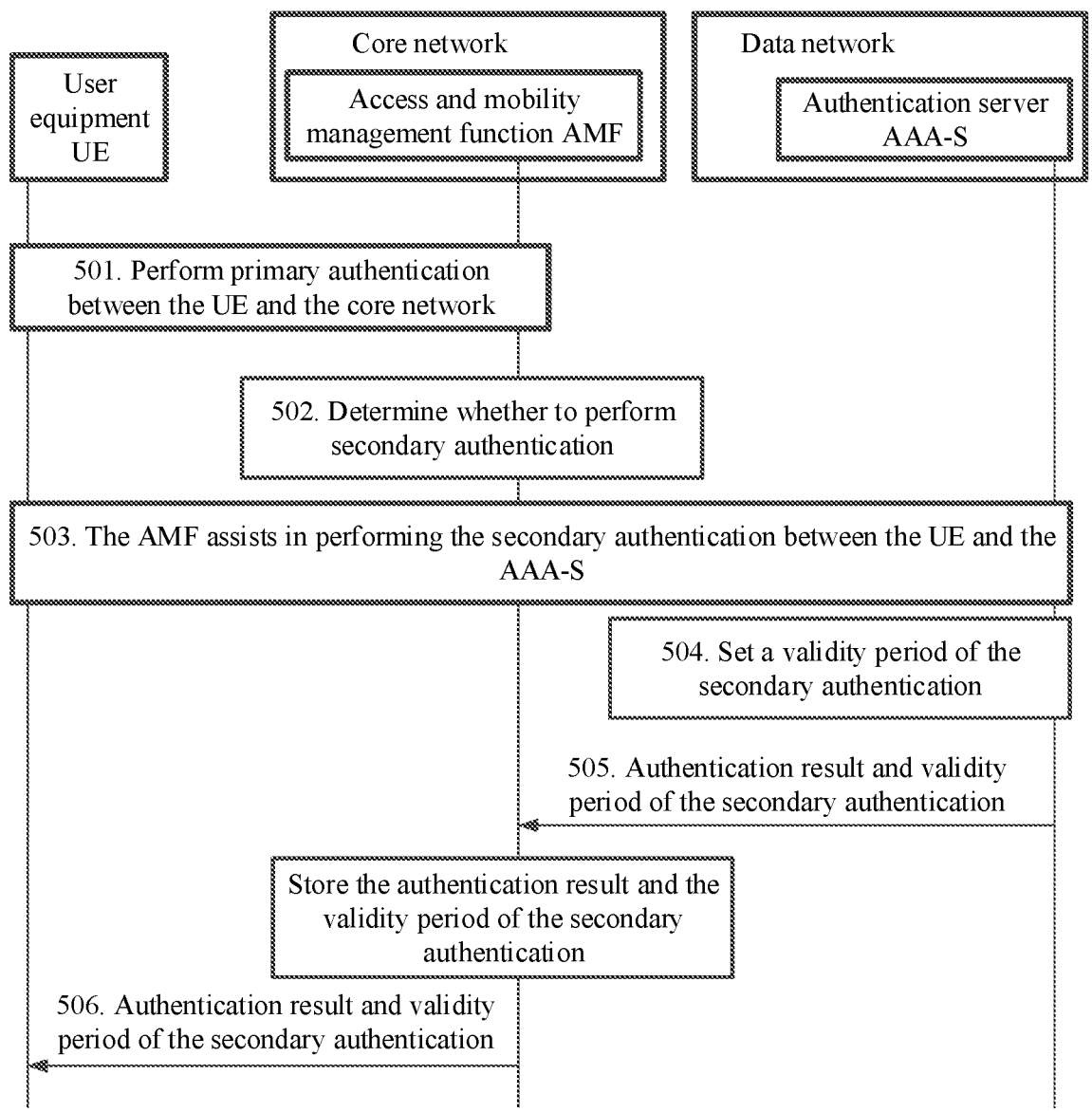
FIG. 5 is a schematic flowchart of a communication method according to an embodiment of this application.

FIG. 5 is a schematic flowchart of a communication method according to an embodiment of this application. In the embodiment shown in FIG. 5, a restriction condition of a validity period is added for secondary authentication. The restriction condition and an authentication result of the secondary authentication may be stored in an AMF and/or a UDM (or in another network function) in a core network.

As shown in FIG. 5, in an example, a communication method may include the following steps.

501. Perform primary authentication between UE and the core network, and establish a security context of the primary authentication.

For example, NAS security is established during the primary authentication, and subsequent NAS signaling interaction between the UE and a network can be encrypted and protected for integrity.

502. The AMF determines whether secondary authentication needs to be performed for the UE (a user using the UE).

A determining method may include: querying local storage of the AMF or querying storage of the UDM.

After the query, it is determined whether the secondary authentication is already performed for the UE and/or the user, and whether a result of successful secondary authentication is still valid. The validity may be indicated by a period of time, during which the result is valid. The validity may alternatively be indicated by a timer (timer). When the timer does not point to 0, the secondary authentication is still valid, or when the timer points to 0, the secondary authentication is invalid. The present invention does not limit a method of how to indicate the validity period.

503. If there is no valid secondary authentication, determine that secondary authentication needs to be performed between the UE and a data network, and the AMF assists the UE in performing the secondary authentication with an AAA-S.

A secondary authentication procedure is similar to a schematic example process of steps 302 to 307 in FIG. 3. Details are not described herein again. For details, refer to the foregoing example description.

Before initiating the secondary authentication between the UE and the AAA-S, the AMF may further determine whether a condition for initiating the secondary authentication is met. Certainly, the initiation condition may alternatively be met by default, which is equivalent to that there is no initiation condition. The AMF initiates the secondary authentication between the UE and the AAA-S only when the condition for initiating the secondary authentication is met.

For example, the condition for initiating the secondary authentication may be determined by using previously stored assistance information of secondary authentication that has been performed once or several times for the current UE or another UE. For example, when an operator network performs secondary authentication for another UE (secondary authentication for S-NSSAI), a condition for initiating the secondary authentication is used to assist the AMF in determining whether to continue a secondary authentication procedure or directly determine that the secondary authentication fails. Similarly, if the secondary authentication fails, an authentication failure cause may be provided to the core network, and the authentication failure cause may be used as assistance information of the secondary authentication, which is used next time by the AMF to assist in determining whether the user or another user meets the condition for the secondary authentication (for the S-NSSAI). For example, the AAA-S successfully authenticates and authorizes the user, but a network capacity of the DN or a user quantity supported by the DN reaches an upper limit. The AAA-S may notify the operator network that the DN is temporarily operating in a full load mode and temporarily does not accept more secondary authentication. In this case, the AAA-S may alternatively send a timer, and the timer is used to limit specific duration indicated by "temporarily". After receiving the timer, the AMF stores the timer into the core network (for example, into the AMF or the UDM). When another UE applies for secondary authentication next time, the application for the secondary authentication can be directly rejected, to prevent unnecessary signaling interaction between the core network of the operator and the DN.

504. If the secondary authentication succeeds, the AAA-S may set a validity period of the secondary authentication (and may further set assistance information of the secondary authentication), and send the validity period and the authentication result of the successful authentication to the core network (such as the AMF).

The validity period may be bound to the S-NSSAI, that is, validity periods of the secondary authentication for different S-NSSAI may be different. The validity period may alternatively be bound to the UE and/or the user, and different UEs and/or users may have different validity periods of secondary authentication for same S-NSSAI.

505. After receiving an authentication result message sent by the AAA-S, the core network (such as the AMF) stores the authentication result and the validity period (and may further store the assistance information).

It should be noted that different storage manners and storage locations may affect the validity period of the authentication result. Main possible storage manners are as follows: (1) The authentication result is bound to the security context of the primary authentication; (2) the authentication result is bound to a context of the UE (independent of another context); (3) a separate "user" context (independent of the context of the UE) is defined.

The following provides optional implementations for the storage manner and the storage location.

(1) The result of the secondary authentication is bound to the result of the primary authentication (or the security context after the primary authentication). In other words, when the security context of the primary authentication becomes invalid, the result of the secondary authentication automatically becomes invalid. This storage manner may cause a potential problem of repeated secondary authentication. This is because UE usually supports secondary authentication for a plurality of pieces of S-NSSAI. When the UE applies for access to specific S-NSSAI, if previous primary authentication is still valid (or there is a security context), only secondary authentication for the S-NSSAI is performed without performing the primary authentication. In this case, however, if the primary authentication is valid but there is not much time left in the validity period, the validity of the successful secondary authentication will become invalid with invalidation of the primary authentication, wasting the secondary authentication. In addition, trying to modify the validity period of the primary authentication based on the result/the validity period of the secondary authentication causes other problems. First, the validity period of the primary authentication may be significantly increased based on the result of the secondary authentication, and setting an excessively long validity period brings risks to security of the security context of the primary authentication. Second, the secondary authentication is usually controlled by an external network, and the primary authentication is controlled by an operator. Increasing the validity of the primary authentication by using the secondary authentication may result in a risk of controlling the primary authentication by the external network.

(2) The result of the secondary authentication is bound to the context of the UE for storage. In other words, when the context of the UE becomes invalid, the result of the secondary authentication also automatically becomes invalid. When this manner is used, independence of the validity period of the result of the secondary authentication needs to be ensured, that is, the result/the validity period of the secondary authentication does not become invalid due to invalidation of another context. Because UE supports secondary authentication for a plurality of pieces of S-NSSAI, validity periods of the secondary authentication differ greatly, which may cause long-time validity of the context of the UE due to existence of the secondary authentication, occupying storage resources. Therefore, in this storage manner, the validity period of the context of the UE needs to be properly set based on a specific situation. If the validity period is excessively short, an actual validity period of the secondary authentication is also shortened, and re-authentication is required. If the validity period is set to be excessively long, excessive storage resources are occupied. In addition, different pieces of S-NSSAI may be processed by different AMFs. Furthermore, same S-NSSAI may also be processed by different AMFs in different time periods (due to reasons such as AMF relocation (AMF relocation) and flow control). In this case, the result/the validity period of secondary authentication may be stored in a center storage manner, which is more efficient, for example, stored in the UDM. The AMF can access and query the UDM to obtain information such as the result/the validity period of the secondary authentication.

(3) A new separate user context is defined, and the user context can be independent of the context of the UE. This is a flexible storage manner, where a user for slice authentication and a bearer terminal (UE) are decoupled. The "user" herein is a user for which the secondary authentication is performed, and the result/the validity period of the slice authentication can be naturally decoupled from the context of the UE. In addition, this manner can more effectively support an application scenario in which a plurality of users use same UE or a same user uses a plurality of UEs. The former means that a plurality of users use a same terminal to access a network at different time points to perform secondary authentication. Although the same terminal is used and the same primary authentication is performed, secondary authentication is independent of each other due to different users. The latter means that a user can use different terminals to access a slice (secondary authentication) at different time points. As long as the slice authentication is valid, the user does not need to perform slice authentication again.

506. The core network sends the result and/or the validity period of the secondary authentication to the UE. The UE may store the received result and/or validity period of the secondary authentication.

In this embodiment, the restriction condition of the validity period is introduced for the secondary authentication, so that the result of the secondary authentication is effectively restricted, thereby helping reduce a security risk of unauthorized slice access, and effectively supporting services of time-limited access and access to a slice with a restriction condition. This also helps avoid a plurality of times of unnecessary slice authentication and improve network resource utilization, and helps effectively support a single-UE multi-user or single-user multi-UE application scenario.

Figure 6:
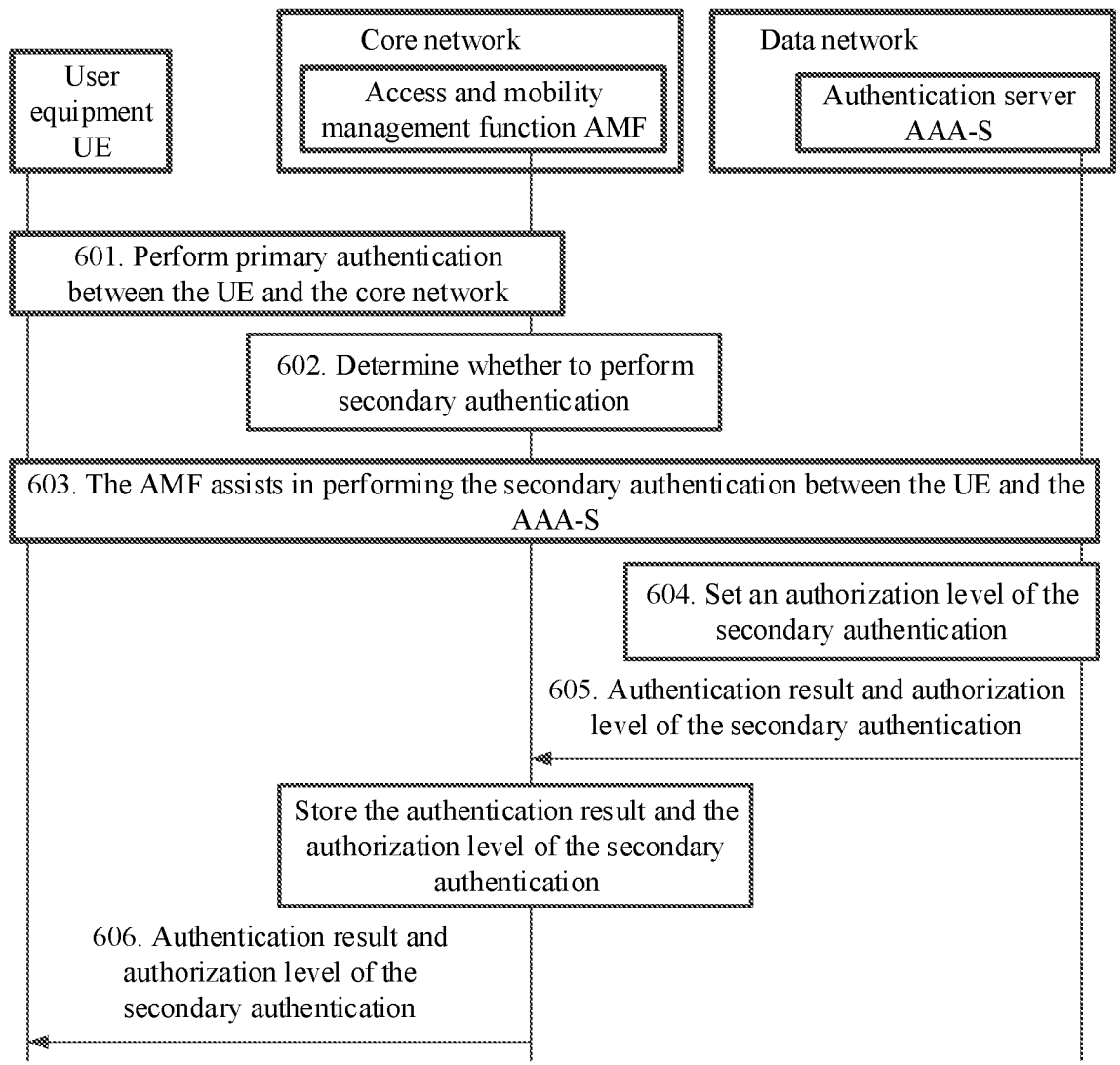
FIG. 6 is a schematic flowchart of another communication method according to an embodiment of this application.

FIG. 6 is a schematic flowchart of another communication method according to an embodiment of this application. In the embodiment shown in FIG. 6, a restriction condition of an authorization level is added for secondary authentication. The restriction condition and an authentication result of the secondary authentication may be stored in an AMF and/or a UDM (or in another network function) in a core network.

As shown in FIG. 6, in an example, the another communication method may include the following steps.

601. Perform primary authentication between UE and the core network, and establish a security context of the primary authentication.

For example, NAS security is established during the primary authentication, and subsequent NAS signaling interaction between the UE and a network can be encrypted and protected for integrity.

602. The AMF determines whether secondary authentication needs to be performed for the UE (a user using the UE).

An authorization status of the stored secondary authentication may be checked, for example, whether the secondary authentication is required or whether the secondary authentication is within a validity period is checked.

603. If there is no valid secondary authentication, determine that the secondary authentication needs to be performed between the UE and a data network, and the AMF assists the UE in performing the secondary authentication with an AAA-S.

A secondary authentication procedure is similar to a schematic example process of steps 302 to 307 in FIG. 3. Details are not described herein again. For details, refer to the foregoing example description.

The AMF may send a secondary authentication request to the AAA-S, and the secondary authentication request may carry, for example, a recommended authorization level for the secondary authentication.

604. If the secondary authentication succeeds, the AAA-S sets an authorization level of the current secondary authentication (and may further set assistance information of the secondary authentication), and sends the authorization level and the authentication result of the successful authentication to the core network (such as the AMF).

It should be noted that regardless of whether the secondary authentication request sent by the AMF to the AAA-S carries the authorization level, the AAA-S may perform an action of setting the authorization level according to a DN policy or the like.

605. After receiving an authentication result message sent by the AAA-S, the core network (such as the AMF) stores the authentication result and the validity period (and may further store the assistance information).

For consideration of a storage manner and a storage location, refer to the example embodiment shown in FIG. 4.

It should be noted that, in one aspect, if different levels use different S-NSSAI, the AMF may allocate "allowed S-NSSAI" based on the authorization level, and send the allowed S-NSSAI in step 606 without sending the authorization level. In another aspect, if different levels use same S-NSSAI, the AMF sends both the allowed S-NSSAI and the authorization level in step 606.

The authorization level for the secondary authentication is similar to authorization levels such as "platinum", "gold", and "silver" in commercial services or games. For example, different authorization levels may have different privileges. A higher authorization level indicates more possessed privileges.

It should be further noted that, the assistance information in this embodiment includes some assistance information, and when the operator network performs secondary authentication (secondary authentication for the S-NSSAI) for another terminal, the assistance information can assist the network in determining whether to continue the secondary authentication procedure or directly determining that the secondary authentication fails. Similarly, if the secondary authentication fails, an authentication failure cause may be provided to the network, and the authentication failure cause may be used as the assistance information, which is used next time by the network to assist in the determining when the secondary authentication (for the S-NSSAI) is performed for the user/terminal or another user/terminal.

606. The core network sends the result of the secondary authentication to the UE. The UE may store the received result of the secondary authentication. Whether the core network sends the authorization level to the UE in this step may depend on the example determining in step 605.

In this embodiment, the restriction condition of the authentication level is introduced for the secondary authentication, so that the secondary authentication is effectively restricted, thereby helping reduce a security risk of unauthorized slice access, and effectively supporting services of time-limited access and access to a slice with a restriction condition. This also helps avoid a plurality of times of unnecessary slice authentication and improve network resource utilization, and helps effectively support a single-UE multi-user or single-user multi-UE application scenario.

Figure 7:
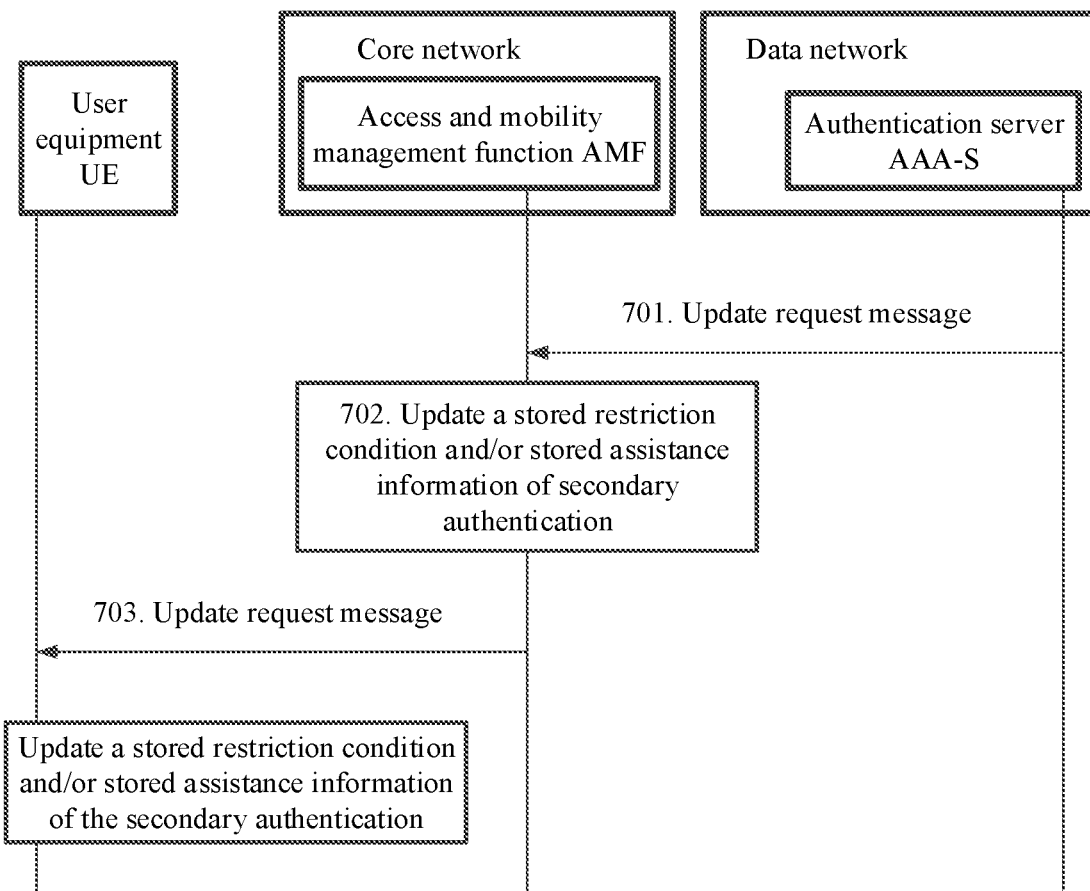
FIG. 7 is a schematic flowchart of another communication method according to an embodiment of this application.

FIG. 7 is a schematic flowchart of another communication method according to an embodiment of this application.

The example embodiment shown in FIG. 7 is a restriction condition update procedure for secondary authentication. An AAA-S stores a result and a restriction condition (such as a validity period or an authorization level) of the secondary authentication for each user based on a previous authentication record. It is assumed that the AAA-S needs to modify a previous restriction condition of secondary authentication for a user (such as changing a validity period and an authorization level) based on a change of subscription data or a policy of a DN/the AAA-S.

701. The AAA-S sends an update request to a core network, where the update request includes a user ID, a terminal ID (such as a GPSI), and a permission value that needs to be updated, and an updated permission value is, for example, a new validity period or an updated authorization level (for example, a silver user is changed to a gold user).

Optionally, the update request may further carry information such as S-NSSAI of the user/a terminal (if the AAA-S can obtain the information).

702. After receiving the update request, the core network (such as an AMF) may update a locally stored restriction condition of the secondary authentication.

In addition, the AMF may further send the update request to a UDM. Optionally, if the AMF knows that another AMF also stores the restriction condition of the secondary authentication, the AMF may directly forward the update request to the another related AMF, to trigger update of restriction condition of the secondary authentication stored in the another AMF.

Accordingly, the UDM also correspondingly updates the restriction condition of the secondary authentication. Optionally, the UDM may also continue to forward the update request to another AMF that stores the restriction condition of the secondary authentication, to trigger the another AMF to update the stored restriction condition of the secondary authentication.

703. The network (such as the AMF) sends the update request to the UE, and the UE updates a locally stored restriction condition of the secondary authentication based on the update request.

It should be noted that steps 702 and 703 may be performed in any order. For example, step 703 may be performed first, and then step 702 is performed.

The solution in this embodiment of this application is mainly for the secondary authentication or slice authentication, and is also applicable to a scenario such as session-specific secondary authentication. Details are not described herein. In this embodiment of this application, the restriction condition is introduced for the secondary authentication, so that the result of the secondary authentication is effectively restricted, thereby helping reduce a security risk of unauthorized slice access, and effectively supporting services of time-limited access and access to a slice with a restriction condition. This helps avoid a plurality of times of unnecessary slice authentication and improve network resource utilization, and helps more effectively support a single-UE multi-user or single-user multi-UE application scenario.

In the solution of this embodiment of this application, backward compatibility may be performed, that is, if no restriction condition is sent, it is equal to unlimited access, or an indication may be implicitly indicated based on a storage feature of the result of the secondary authentication.

Figure 8:
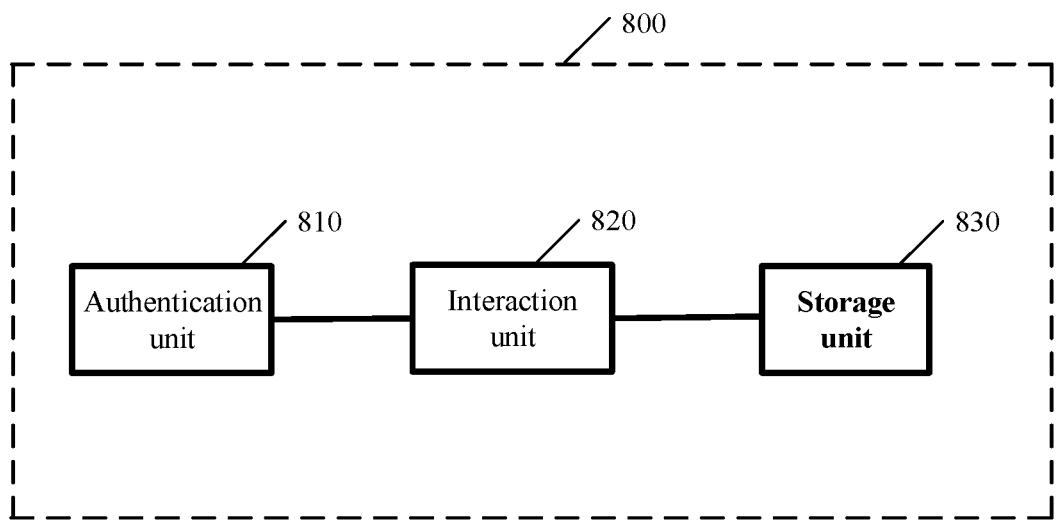
FIG. 8 is a schematic diagram of a structure of user equipment according to an embodiment of this application.

Refer to FIG. 8. An embodiment of this application provides user equipment 800, including:

an authentication unit 810, configured to: after primary authentication between a core network and the user equipment succeeds, perform secondary authentication with a data network with the assistance of the core network if the secondary authentication further needs to be performed between the user equipment and the data network;

an interaction unit 820, configured to receive an authentication result of the secondary authentication and a restriction condition of the secondary authentication that are sent by the core network; and a storage unit 830, configured to store the received authentication result of the secondary authentication and the received restriction condition of the secondary authentication.

In some embodiments, the authentication unit 810 is further configured to: when the authentication result of the secondary authentication is authentication failure and the restriction condition of the secondary authentication is a validity period of the authentication result, re-initiate the secondary authentication with the data network after it is determined that the validity period of the authentication result ends; or suspend initiation of the secondary authentication with the data network before it is determined that the validity period of the authentication result ends.

In some embodiments, the interaction unit 820 is further configured to receive assistance information of the secondary authentication sent by the core network; and re-initiate the secondary authentication with the data network when it is determined that a condition for initiating the secondary authentication for the user equipment is met; or suspend initiation of the secondary authentication with the data network when it is determined that a condition for initiating the secondary authentication for the user equipment is not met. The assistance information is used to determine a condition for initiating next secondary authentication for the user equipment.

Modules of the user equipment 800 may cooperate to perform some or all of the steps of the methods performed by the UE in the foregoing method embodiments.

Figure 9:
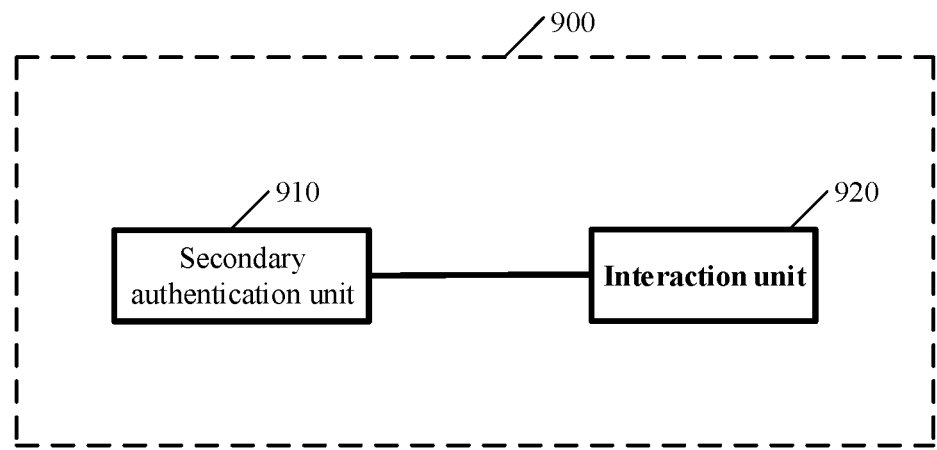
FIG. 9 is a schematic diagram of a structure of an authentication server according to an embodiment of this application.

Refer to FIG. 9. An embodiment of this application provides an authentication server 900 in a data network, including:
- a secondary authentication unit 910, configured to perform secondary authentication between the data network and user equipment with the assistance of a core network (such as an AMF); and
- an interaction unit 920, configured to send an authentication result of the secondary authentication and a restriction condition of the secondary authentication to the core network (such as the AMF), where the authentication result of the secondary authentication and the restriction condition of the secondary authentication can be stored by the core network.

In some embodiments, the restriction condition of the secondary authentication may include, for example, a validity period of the authentication result of the secondary authentication and/or an authorization level of the secondary authentication.

In some embodiments, the interaction unit 920 is further configured to send assistance information of the secondary authentication to the core network. The assistance information can be stored by the core network, and the assistance information can be used to determine a condition for initiating next secondary authentication for the user equipment or another user equipment.

In some embodiments, the interaction unit 920 is further configured to send, to the core network, an update request for requesting to update the restriction condition of the secondary authentication, where the update request is used to trigger the core network to update the stored restriction condition of the secondary authentication.

Modules of the authentication server 900 may cooperate to perform some or all of the steps of the methods performed by the authentication server in the foregoing method embodiments.

Figure 10:
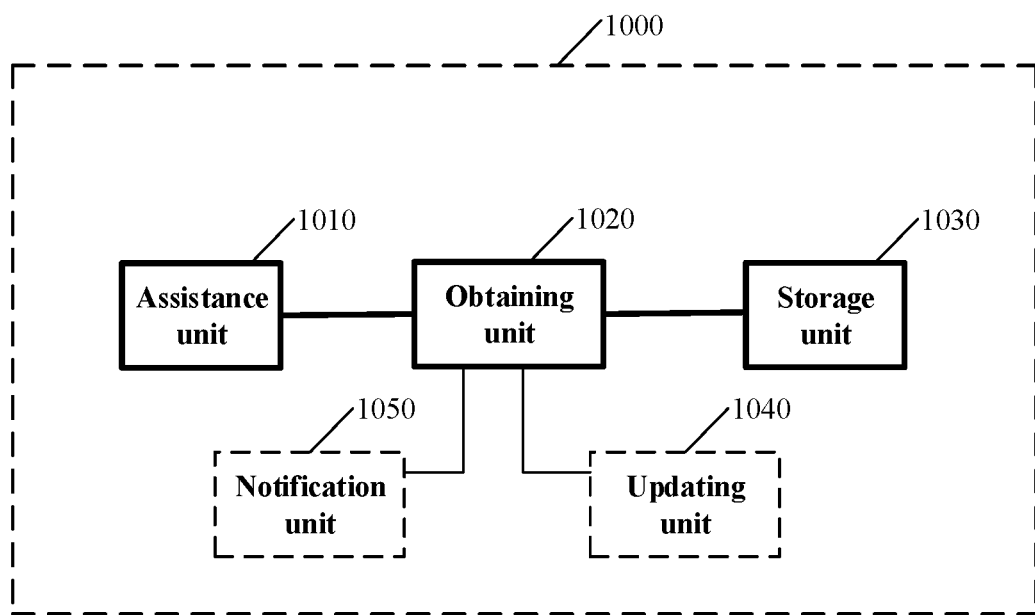
FIG. 10 is a schematic diagram of a structure of a network function entity in a core network according to an embodiment of this application.

Refer to FIG. 10. An embodiment of this application provides a network function entity 1000 in a core network. The network function entity 1000 may include:
- an assistance unit 1010 is configured to: after primary authentication between the core network and user equipment succeeds, assist a data network in performing secondary authentication between the data network and the user equipment if the secondary authentication further needs to be performed between the data network and the user equipment;
- an obtaining unit 1020, configured to obtain an authentication result of the secondary authentication and a restriction condition of the secondary authentication from the data network; and
- a storage unit 1030, configured to store the obtained authentication result of the secondary authentication and the obtained restriction condition of the secondary authentication into the core network (for example, into an AMF or a UDM in the core network).

It can be learned that, in the foregoing example solution, the restriction condition is introduced for the secondary authentication, to make it possible that the authentication result of the secondary authentication is properly restricted for use, and to lay a foundation for effective management of the authentication result of the secondary authentication, thereby helping improve security and effectiveness of operation of a secondary authentication-based service.

In some embodiments, the restriction condition of the secondary authentication may include, for example, a validity period of the authentication result of the secondary authentication and/or an authorization level of the secondary authentication.

In some embodiments, the authentication result of the secondary authentication and an authentication result of the primary authentication are bound by the storage unit 1030 for storage (that the authentication result of the secondary authentication and an authentication result of the primary authentication are bound for storage may indicate that validity periods of the authentication result of the secondary authentication and the authentication result of the primary authentication are the same or have a correspondence) or stored separately; or the authentication result of the secondary authentication and a context of the user equipment are bound for storage by the storage unit (that the authentication result of the secondary authentication and a context of the user equipment are bound for storage may indicate that validity periods of the authentication result of the secondary authentication and the context of the user equipment are the same or have a correspondence) or stored separately. Alternatively, the validity period of the secondary authentication is equal to or not equal to (greater than or less than) a validity period of a context of the user equipment, or the validity period of the secondary authentication is equal to or not equal to (greater than or less than) a validity period of the primary authentication.

In some embodiments, that an assistance unit 1010 assists a data network in performing secondary authentication between the data network and the user equipment includes: when it is determined that a condition for initiating the secondary authentication for the user equipment is met, assist the data network in performing the secondary authentication between the data network and the user equipment. In addition, when it is determined that the condition for initiating the secondary authentication for the user equipment is not met, a request for the secondary authentication for the user equipment may be rejected, or it is directly determined that the secondary authentication between the data network and the user equipment is not successful.

In some embodiments, the obtaining unit 1020 is further configured to obtain assistance information of the secondary authentication from the data network.

The storage unit is further configured to store the obtained assistance information of the secondary authentication into the core network, where the assistance information can be used to determine a condition for initiating next secondary authentication for the user equipment or another user equipment.

In some embodiments, the network function entity in the core network further includes a notification unit 1040, configured to send the obtained authentication result of the secondary authentication and the obtained restriction condition of the secondary authentication to the user equipment. The user equipment can receive and store the authentication result of the secondary authentication and the restriction condition of the secondary authentication.

In some embodiments, the network function entity in the core network further includes an update unit 1050, configured to: when an update request for requesting to update the restriction condition of the secondary authentication is received from the data network, update, based on the update request, the restriction condition of the secondary authentication stored in the core network.

Further, the notification unit 1040 may be further configured to: when the network function entity receives, from the data network, the update request for requesting to update the restriction condition of the secondary authentication, send the update request to the user equipment. After receiving the update request, the user equipment may update, based on the update request, the restriction condition of the secondary authentication stored by the user equipment.

Modules of the network function entity 1000 may cooperate to perform some or all of the steps of the methods performed by the AMF in the foregoing method embodiments.

Figure 11:
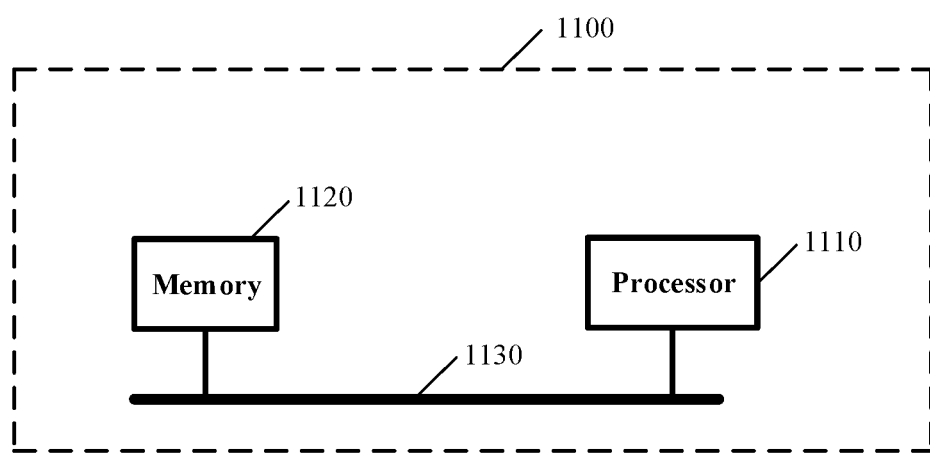
FIG. 11 is a schematic diagram of a structure of a communication apparatus according to an embodiment of this application.

Refer to FIG. 11. An embodiment of this application further provides a communication apparatus 1100, where the communication apparatus includes a processor 1110 and a memory 1120 that are coupled. The processor is configured to invoke a program stored in the memory, to implement some or all of the steps of any method performed by any device provided in the embodiments of this application. For example, when the processor performs some or all of the steps performed by the UE in the foregoing method embodiments, the communication apparatus 1100 is UE. When the processor performs some or all of the steps performed by the AMF in the foregoing method embodiments, the communication apparatus 1100 is an AMF. When the processor performs some or all of the steps performed by the authentication server AAA-S in the foregoing method embodiments, the communication apparatus 1100 is an authentication server in a data network. The rest may be deduced by analogy.

The processor 1110 is configured to invoke a computer program stored in the memory 1120, to implement some or all of the steps of any method performed by a device such as the UE, the AMF, or the AAA-S in the embodiments of this application.

The processor 1110 may also be referred to as a central processing unit (CPU). In a specific application, various components of the communication apparatus are coupled, for example, by using a bus system. The bus system may further include a power bus, a control bus, a status signal bus, and the like, in addition to a data bus. However, for clear description, various types of buses in the figure are marked as a bus system 1130. The method disclosed in the foregoing embodiments of this application may be applied to the processor 1110, or implemented by the processor 1110. The processor 1110 may be an integrated circuit chip and has a signal processing capability. In some implementation processes, all or some steps of the foregoing methods may be implement by using an integrated logic circuit of hardware in the processor 1110 or instructions in a form of software. The processor 1110 may be a general-purpose processor, a digital signal processor, an application-specific integrated circuit, a field programmable gate array or another programmable logic device, a discrete gate or a transistor logic device, or a discrete hardware component. The methods, the steps, and logical block diagrams that are disclosed in the embodiments of this application may be implemented or performed by the processor 1110. The general-purpose processor 1110 may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1120. For example, the processor 1110 can read information from the memory 1120, and implements some or all of the steps of the foregoing method in combination with hardware of the processor 1110.

In addition, an embodiment of this application further provides a computer-readable storage medium. The computer-readable storage medium stores a computer program. The computer program is executed by related hardware, to implement any method provided in the embodiments of the present invention.

In addition, an embodiment of this application further provides a computer program product. When the computer program product runs on a computer, the computer is enabled to perform any method provided in the embodiments of the present invention.

In the foregoing embodiments, descriptions of the embodiments have respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to optional embodiments, and the involved actions and modules are not necessarily required by this application.

In the several embodiments provided in this application, it should be understood that the disclosed apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software function unit and sold or used as an independent product, the integrated unit may be stored in a storage medium accessible to a computer. Based on such an understanding, the technical solutions of this application essentially, or the part contributing to the conventional technology, or all or some of the technical solutions may be implemented in a form of a software product. The computer software product is stored in a computer-readable storage medium and includes several instructions for instructing a computer device (which may be a personal computer, a server, a network device, or the like, and may be specifically a processor in the computer device) to perform all or some of the steps of the methods in the embodiments of this application. The storage medium may include any medium that can store program code, such as a USB flash drive, a removable hard disk, a magnetic disk, an optical disc, a read-only memory (ROM), or a random access memory (RAM).

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communication method, comprising:
after primary authentication between a core network and a user equipment succeeds, assisting, by a network function entity in the core network, a data network in performing secondary authentication between the data network and the user equipment when the secondary authentication further needs to be performed between the data network and the user equipment;
obtaining, by the network function entity, an authentication result of the secondary authentication and a restriction condition of the secondary authentication from the data network; and
storing, by the network function entity, the obtained authentication result of the secondary authentication and the obtained restriction condition of the secondary authentication into the core network.

2. The method according to claim 1, wherein the restriction condition of the secondary authentication comprises a validity period of the authentication result of the secondary authentication.

3. The method according to claim 2, wherein the authentication result of the secondary authentication and an authentication result of the primary authentication are bound for storage or stored separately; or
the authentication result of the secondary authentication and a context of the user equipment are bound for storage or stored separately, or
the validity period of the secondary authentication is not equal to a validity period of a context of the user equipment, or
the validity period of the secondary authentication is not equal to a validity period of the primary authentication.

4. The method according to claim 1, wherein the restriction condition of the secondary authentication comprises an authorization level of the secondary authentication.

5. The method according to claim 1, wherein the assisting, by a network function entity in the core network, a data network in performing secondary authentication between the data network and the user equipment is performed in response to a determination that a condition for initiating the secondary authentication for the user equipment is met.

6. The method according to claim 5, wherein the method further comprises:
obtaining, by the network function entity, assistance information of the secondary authentication from the data network, and
storing, by the network function entity, the obtained assistance information of the secondary authentication into the core network, wherein the assistance information is for determining a condition for initiating next secondary authentication for the user equipment or another user equipment.

7. The method according to claim 5, wherein the method further comprises:
sending, by the network function entity, the obtained authentication result of the secondary authentication and the obtained restriction condition of the secondary authentication to the user equipment.

8. The method according to claim 1, wherein the method further comprises:
when receiving, from the data network, an update request for requesting to update the restriction condition of the secondary authentication, updating, by the network function entity based on the update request, the restriction condition of the secondary authentication stored in the core network.

9. The method according to claim 1, further comprising:
performing, by an authentication server in the data network, secondary authentication between the data network and the user equipment with the assistance of the core network;
sending, by the authentication server, the authentication result of the secondary authentication and the restriction condition of the secondary authentication to the network function entity.

10. A communication method, comprising:
after primary authentication between a core network and a user equipment succeeds, performing, by the user equipment, secondary authentication with a data network with the assistance of the core network when the secondary authentication further needs to be performed between the user equipment and the data network;
receiving, by the user equipment from the core network, an authentication result of the secondary authentication and a restriction condition of the secondary authentication; and
storing, by the user equipment, the received authentication result of the secondary authentication and the received restriction condition of the secondary authentication.

11. The method according to claim 10, wherein
when the authentication result of the secondary authentication is an authentication failure and the restriction condition of the secondary authentication is a validity period of the authentication result, the method further comprises:
re-initiating, by the user equipment, the secondary authentication with the data network after it is determined that the validity period of the authentication result ends; or
suspending, by the user equipment, initiation of the secondary authentication with the data network before it is determined that the validity period of the authentication result ends.

12. The method according to claim 10, wherein the method further comprises:
receiving, by the user equipment from the core network, assistance information of the secondary authentication; and
re-initiating, by the user equipment, the secondary authentication with the data network when it is determined that a condition for initiating the secondary authentication for the user equipment is met based on the assistance information; or suspending, by the user equipment, initiation of the secondary authentication with the data network when it is determined that a condition for initiating the secondary authentication for the user equipment is not met based on the assistance information;

wherein the assistance information is used to determine a condition for initiating a next secondary authentication for the user equipment.

13. A communication apparatus in a core network, comprising:
a memory configured to store instructions;
a processor coupled to the memory; and
a receiver coupled to the processor, wherein the instructions cause the processor to be configured to:
after primary authentication between the core network and a user equipment succeeds, assist a data network in performing secondary authentication between the data network and the user equipment when the secondary authentication further needs to be performed between the data network and the user equipment;
obtain an authentication result of the secondary authentication and a restriction condition of the secondary authentication from the data network; and
store the obtained authentication result of the secondary authentication and the obtained restriction condition of the secondary authentication into the core network.

14. The communication apparatus according to claim 13, wherein the restriction condition of the secondary authentication comprises a validity period of the authentication result of the secondary authentication.

15. The communication apparatus according to claim 13, wherein the authentication result of the secondary authentication and an authentication result of the primary authentication are bound for storage or stored separately; or
the authentication result of the secondary authentication and a context of the user equipment are bound for storage or stored separately, or
the validity period of the secondary authentication is not equal to a validity period of a context of the user equipment, or
the validity period of the secondary authentication is not equal to a validity period of the primary authentication.

16. The communication apparatus according to claim 13, wherein the instructions father cause the apparatus to:
obtain assistance information of the secondary authentication from the data network;
store the assistance information of the secondary authentication; and
when it is determined that a condition for initiating the secondary authentication for the user equipment is met according to the assistance information of the secondary authentication, assist the data network in performing the secondary authentication between the data network and the user equipment.

17. The communication apparatus according to claim 13, wherein the instructions further cause the apparatus to:
receive, from the data network, an update request for requesting to update the restriction condition of the secondary authentication, and
update, based on the update request, the restriction condition of the secondary authentication stored in the core network.

18. A communication apparatus in a core network, comprising:
a memory configured to store instructions;
a processor coupled to the memory; and
a receiver coupled to the processor, wherein the instructions, when executed by the processor, cause the apparatus to:
after primary authentication between a core network and the communication apparatus succeeds, perform secondary authentication with a data network with the assistance of the core network when the secondary authentication further needs to be performed between the user equipment and the data network;
receive an authentication result of the secondary authentication and a restriction condition of the secondary authentication from the core network; and
store the authentication result of the secondary authentication and the restriction condition of the secondary authentication.

19. The communication apparatus according to claim 18, wherein when the authentication result of the secondary authentication is an authentication failure and the restriction condition of the secondary authentication is a validity period of the authentication result, the instructions further cause the apparatus to:
reinitiate the secondary authentication with the data network after it is determined that the validity period of the authentication result ends; or
suspend initiation of the secondary authentication with the data network before it is determined that the validity period of the authentication result ends.

20. The communication apparatus according to claim 18, wherein the instructions further cause the apparatus to:
receive, from the core network, assistance information of the secondary authentication; and
reinitiate the secondary authentication with the data network when it is determined that a condition for initiating the secondary authentication for the communication apparatus is met based on the assistance information; or
suspend initiation of the secondary authentication with the data network when it is determined that a condition for initiating the secondary authentication for the communication apparatus is not met based on the assistance information;
wherein the assistance information is used to determine a condition for initiating next secondary authentication for the communication apparatus.

* * * * *